US 7,485,872 B2

(12) United States Patent
Frisch et al.

(10) Patent No.: US 7,485,872 B2
(45) Date of Patent: Feb. 3, 2009

(54) LARGE AREA, PICO-SECOND RESOLUTION, TIME OF FLIGHT DETECTORS

(75) Inventors: Henry J. Frisch, Chicago, IL (US); Harold Sanders, Chicago, IL (US); Fukun Tang, Chicago, IL (US); Tim Credo, Highland Park, IL (US)

(73) Assignee: The University of Chicago, Chicago, IL (US)

( * ) Notice: Subject to any disclaimer, the term of this patent is extended or adjusted under 35 U.S.C. 154(b) by 162 days.

(21) Appl. No.: 11/583,299

(22) Filed: Oct. 19, 2006

(65) Prior Publication Data

US 2007/0187596 A1 Aug. 16, 2007

Related U.S. Application Data

(60) Provisional application No. 60/728,545, filed on Oct. 19, 2005.

(51) Int. Cl.
*H01J 35/08* (2006.01)
*G21K 7/00* (2006.01)
*H05H 3/00* (2006.01)

(52) U.S. Cl. .................. 250/397; 250/287; 250/286; 250/251; 250/309

(58) Field of Classification Search .......... 250/387, 250/287, 286, 251, 309
See application file for complete search history.

(56) References Cited

U.S. PATENT DOCUMENTS

| | | | |
|---|---|---|---|
| 6,734,429 B2 * | 5/2004 | Takagi | 250/310 |
| 7,109,483 B2 * | 9/2006 | Nakasuji et al. | 250/310 |
| 2004/0135992 A1 | 7/2004 | Munro | |
| 2004/0213463 A1 | 10/2004 | Morrison | |

OTHER PUBLICATIONS

Buerle Industries Fast Small-Area Dectectors Web Page at http://www.burle.com/tofadvdet.htm. 2 pages; © 2004 Buerle Technologies, Inc.
Hamamatsu Microchannel Plate-Photomultiplier Tube (MCP-PMTs) R3809U-50 Series Promotional Materials for Compact MCP-PMT Series Featuring Variety of Spectral Response with Fast Time Response © 1997 Hamamatsu Photonics K.K.

(Continued)

*Primary Examiner*—Nikita Wells
(74) *Attorney, Agent, or Firm*—Brinks Hofer Gilson & Lione

(57) ABSTRACT

A detector for detecting a particle is disclosed. The detector includes a charge emitter that emits a charge in response to receipt of the particle, an anode for receiving the emitted charge, and electronics for determining whether there is received charge on the anode. The anode may include a pad for receiving the charge and a plurality of conduits (such as transmission lines) for transmitting the charge to the electronics. The anode may be designed to reduce the variance in the path length from the pad of the anode to the electronics. For example, the plurality of conduits in the anode may be constructed such that the transit time of the charge from the pad varies less than a predetermined time. Further, a capacitive element may be included in the detector in order to capacitively couple with the charge emitter. The capacitive element may include a grid that is in the same layer as the pads of the anode in order to provide a short and less variable circuit return path to the charge emitter.

25 Claims, 20 Drawing Sheets

OTHER PUBLICATIONS

D.A. Hill, D.O. Caldwell, D.H. Frisch, L.S. Osborne, D.M. Ritson, and R. A. Schluter, "High Resolution Focusing Gas Cherenkov Detector for High Energy Particles," Feb. 1961; pp. 111-117; © 1997 The American Institute of Physics; The Review of Science Instruments.

I. Adam, et al. "The DIRC Particle Identification System for the BaBar Experiment," 2005; pp. 281-357; Nuclear Instruments & Methods in Physics Research A538.

M. Akatsu, et. Al. "MCP-PMT Timing Property For Single Photons," 2004; pp. 763-775; Nuclear Instruments & Methods in Physics Research A528.

Ch. Paus, et al. "Design and Performance Tests of the CDF Time-of-Flight System," 2001; pp. 579-581; Nuclear Instruments & Methods in Physics Research A461.

T. Iijima, et al. "Aerogel Cherenkov Counter For The BELLE Detector," 2000; pp. 321-325; Nuclear Instruments & Methods in Physics Research A453.

Sven E. Vahsen, et al. "Precision Timing via Cerenkov Radiation," Sep. 1998; www.puhep1.princeton.edu/mumu/timing.pdf.

C. Lu, et al. "First Tests of the Timing Resolution of Microchannel-Plate Photomultipliers Viewing Cerenkov Radiation," Jun. 18, 1994; pp. 1-3; Princeton/HEP/94-11.

PowerPoint Presentation "Planacon MCP-PMT for use in Ultra-High Speed Applications," Photonis; 10 Picosecond Timing Workshop, Apr. 28, 2006; 19 pages.

Henry Frisch et al., PowerPoint Presentation "The Development of Large-Area Psec-Resolution TOF Systems," May 3, 2006—HFJ Arlington, Texas; 20 pages.

Credo, et al. "Developing Large-area Psec Timing: The MCP Return-Path Problem and a Proposed Solution," Jul. 20, 2006; pp. 1-20; Vers. 2.0.

Henry Frisch, "Pico-second Time-of-Flight Detector Development," Jul. 13, 2005; Research Techniques Seminar, Fermilab; Enrico Fermi Institute, University of Chicago; 19 pages.

WW Moses, "Time of Flight in PET Revisited," Oct. 2003; IEEE Transactions on Nuclear Science, vol. 50, No. 5; pp. 1325-1330.

* cited by examiner

LARGE AREA, PICO-SECOND RESOLUTION, TIME OF FLIGHT DETECTORS

RELATED APPLICATION

This application claims the benefit of U.S. Provisional Application No. 60/728,545, filed on Oct. 19, 2005. U.S. Provisional Application No. 60/728,545 is hereby incorporated by reference herein in its entirety.

GOVERNMENT LICENSE RIGHTS

This invention was made with government support under PHY0456688 awarded by the National Science Foundation. The government has certain rights in the invention.

BACKGROUND

The field of high-energy physics endeavors to identify various sub-atomic particles, such as hadrons. There are two techniques presently used to distinguish hadrons at colliders. The first technique uses Cherenkov counters to distinguish particles by the dependence of Cherenkov angle on velocity. See T. Iijima et al., Nucl. Instrum. Meth. A453:321-325, 2000; see also I. Adam et al., Nucl. Instrum. Meth. A538:281-357, 2005. In the limited path length available in a cylindrical collider experiment, the first technique has several limitations including being applicable only for momenta up to a few GeV and requiring significant radial space. The second technique is time-of-flight, in which the transit time from creation of the particle to an outer ring of detectors is measured. The second technique may also provide the velocity of the particle. The typical time resolution using the detectors of the second technique is 110 psec. See C. Paus et al., Nucl. Instrum. Meth. A461 :579-581, 2001. In both techniques combining the velocity measurement with the momentum measurement in the magnetic spectrometer, one may measure the mass of the particle, and hence its identity (e.g., pion or kaon).

A need exists to identify various sub-atomic particles without the limitations of prior techniques.

SUMMARY OF THE INVENTION

Time-of-flight systems may be used to measure the travel time of a particle. The time-of-flight system may include one or more detectors. The detector may comprise a charge emitter that emits a charge in response to receipt of a particle, an anode that receives the emitted charge, and electronics that sense the charge on the anode. One example of a charge emitter may include a window (which may comprise magnesium fluoride or fused silica), a photocathode, followed by the chevron micro-channel plate. Impact of a particle on the window may create electromagnetic radiation (such as Cherenkov light), with the photocathode emitting electrons when struck by the electromagnetic radiation. The electrons may be channeled into the micro-channel plate for amplification and emission to the anode. The anode may comprise one or more pads to receive the charge and conduits to interface with the electronics that determines whether charge is resident on the one or more pads.

The anode of the detector may be designed to reduce the variance in the path length from the pad of the anode to the electronics. The pad of the anode may be subdivided or segmented into a plurality of pads to receive the charge emitted. Further, the conduits of the anode may include any trace or transmission line (such as two flat pieces of metal and a dielectric in between) and transmit the charge output from the pad. For example, a transmission line may emanate from each of the plurality of pads. The anode may further comprise collection points whereby the outputs of two or more transmission lines may meet. The collection points may interface with electronics, such as digitization chips.

The conduits of the anode may be configured such that the transit time of the charge from the plurality of pads to the electronics (or to a collection point) is constant (or does not vary greater than a predetermined amount). An example of conduits configured in such a manner includes transmission lines whose lengths from the pads to the electronics (or collection point) are equal or whose lengths do not differ greater than a predetermined amount (such as 300 microns in spatial resolution which corresponds to one psec in time resolution). Because the travel time through the conduits is equal (or nearly equal), the anode reduces or eliminates the variance in time from the sensing of the charge at the pad to the collection points. Specifically, the travel time of a charge from one pad to the electronics (or its respective collection point) is approximately equal to the travel time of another pad to the electronics (or its respective collection point). In this manner, the anode may be used for time sensitive measurements, such as in high-energy and nuclear physics.

The resolution of the time-of-flight system may also be improved by using a capacitive element to capacitively couple to the charge emitter, with the capacitive element being proximate to the anode. For the charge on the pad of the anode to flow to the electronics, a return path is created. The return path in a typical micro-channel plate time-of-flight system adversely affects the time resolution of the system, requiring the path for current flow goes across the anode, up the side of the micro-channel plate, and back across the micro-channel plate plane to the pores that are the source of the charge. This return path creates several problems in the time resolution of the detector including an excessive inductance of the circuit that dominates the rise time of the signal, and hence may adversely affect the time resolution of the detector, and a variable return path depending on where in the micro-channel pate.

A capacitive element (such as an at least partly capacitive element) may create a return path with the charge emitter for the charge resident on the pad (or plurality of pads) of the anode to travel to the electronics. For example, a charge emitter that includes a micro-channel plate may be capacitively coupled to a grid that encircles the plurality of pads, thereby being proximate to the pads of the anode. The grid may be in the same layer of the pad of the anode so that the return path is shorter than without the grid, thereby reducing the inductance of the circuit and reducing the variance in the return path. In this manner, the time-of-flight system may be used for time sensitive measurements.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Time-of-flight systems may be used in a variety of applications, including high energy physics, nuclear physics, and radiology. In high energy physics, experimental probing of many of the most fundamental problems relies on the identification of "flavor," the quantum numbers that differentiate the 6 kinds of quarks and the three generations of leptons. For example, the Higgs boson is expected to decay primarily to b-quarks, as they are massive. The top quark, which is strikingly more massive than the other quarks, decays into a W boson and a b quark; the W itself decays equally to a pair of light quarks, the up and down quark, and to somewhat heavier pair, the strange and charm quarks. The identification of b-quarks is a major tool in the study of the properties of the top quark.

The quarks themselves are not stable, and essentially instantaneously decay to states of integer electric charge and zero net color (the charge of the strong interaction). These states comprise a number of particles, which may include pions, kaons, protons, etc., and also the leptons (electron, muon, tau, and their neutrinos). By measuring the final particles, one may reconstruct the parent process, and hence investigate the deeper questions of mass and flavor.

Identifying the secondary particles is therefore one of the goals of particle detectors. One type of detector comprises large devices built around the sites where the beams intersect. One example includes a detector built in and around a large solenoidal magnet, these detectors consist of various devices to measure the time, position, direction, and energy of the secondary particles. The large magnetic field (typically on the order of 1-2 Tesla) bends the tracks of charged particles, giving a measure of their momentum. Another type comprises a detector, such as fixed-target detectors, that do not focus on the beams intersecting.

Figure 1:
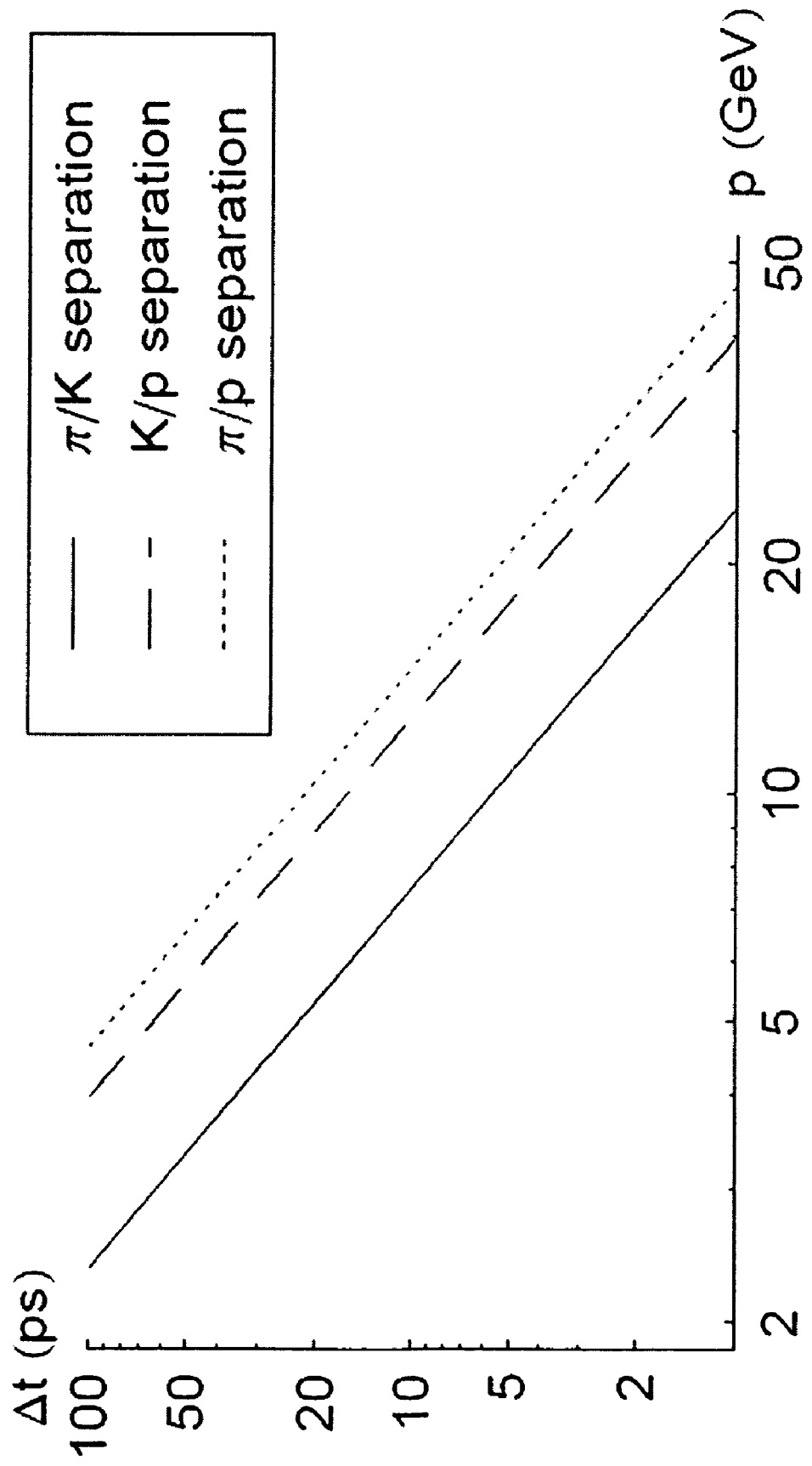
FIG. 1 is a graph of travel time as a function of momentum for charged hadrons to travel 1.5 m.

The charged hadrons $\pi$, K, and p, the predominant types produced in collisions, have very similar interaction characteristics. For momenta above a few GeV most particle detectors measure only the 3-momentum, and cannot distinguish one hadron from another. The mass can be measured by combining a velocity measurement with the momentum measurement. This velocity measurement is a goal of time-of-flight (TOF) systems. Since the secondary particles are typically moving at nearly the speed of light, the time differences between different particles with the same momentum are very small. FIG. 1 shows the difference in the time it takes the charged hadrons to travel 1.5 m, as a function of momentum. Specifically, FIG. 1 shows the contours of 1-sigma separation for pions, kaons, and protons versus the time resolution of the flight time over a 1.5 meter path. The simulations discussed below provide a resolution on the order of 1 psec for a single module; applied to a large system, it would allow $\pi$/K separation to approximately 15 GeV at the 1 sigma level.

More accurate mass measurements may also allow the identification of stable heavy exotic particles which would otherwise be misidentified as known particles, and could also allow the detection of heavy unstable particles from the identification of delayed secondaries if then lifetimes are long enough. However, time-of-flight systems, such as large-area time-of-flight systems, may be prone to time resolutions that are greater than desired. The large time resolution of traditional time-of-flight systems is due to a variety of factors including: (1) the long light paths with their consequent variation; and (2) the jitter of conventional photomultipliers. The typical time resolution using the detectors may be on the order of 100 psec. The time resolution limits the ability of the photodetectors to detect certain types of particles.

The time resolution of the detectors may be improved by analyzing the characteristic lengths describing the signal path (whether it be light or electrical current) and reducing the variations in the characteristic lengths. Specifically, each point along the signal path (from the light used, the light collection, the path of the charge in the optical detector, and the electrical path of charge collection and digitization) may be analyzed so that the variation is less than a predetermined amount (e.g., 1 psec). For example, analyzing a typical micro-channel plate photomultiplier tube device, including the frequency dependence of the Cherenkov light, the absorption in the window, the photo-cathode response, the time jitter in the micro-channel plate, and the path-length and electrical properties of the transmission lines and pads of the anode, a resolution on the order of 1 psec or less may be achieved for a MCP with 25 micron pores or smaller.

In this manner, time-of-flight resolution on the order of 1 psec (approximately 100 times more accurate than currently available time-of-flight systems) may be desired to separate pions from kaons up to at least 20 GeV in a detector the size of a collider detector, such as a collider detector at Fermi Lab (CDF) (radius approximately 1.5 meters). The time-of-flight system may also be used for imaging, such as in a system to define the geometry of an event. For example, the localization in time for a photon corresponds to a localization in space along the direction of motion of the point of origin, as the velocity of all photons is the speed of light. With a thin photo-detecting layer in front of the device, the equal-time anode may allow detection of photons from positron-electron annihilation or other sources of diagnostic radiation.

As discussed in more detail below, to improve the time resolution, the light used may be Cherenkov light since it is intrinsically fast without any characteristic decay time like in a scintillator. After generating the electromagnetic radiation, it may then be detected after traversing only a short path length (such as no bounces). Specifically, with regard to light collection, the Cherenkov light may travel directly onto a phototube cathode so that variations in the optical path of the light are small. With regard to the path of the charge in the optical detector, a micro-channel plate (MCP) photomultiplier tube may be used. Because of the small channel diameter and compactness of the device, which is only several millimeters thick, electron path lengths through the MCP do not vary significantly; small MCPs are available with measured single photon transit time spreads (TTS) of 10 psec (FWHM).

Further, the electrical path of the charge collection is analyzed in order to reduce variation below a predetermined amount including: (1) designing the circuitry (such as the transmission lines) from the anode to the detection circuitry to reduce variations in the signal path from the anode to the detection circuitry (one example discussed below is described as the "equal-time anode"); and (2) including a capacitive element (one example discussed below includes a grid) to couple the anode to the circuitry that sends charge to the anode (such as the MCP). With the increased precision of the detectors, particles may thus be tracked by the tracking systems, and extrapolated to the time-of-flight system to give a precise location of where the particle struck. By analyzing the entire signal path, the variations in the characteristic lengths describing the signal path may be reduced to a desired amount. For example, if a goal of the photodetector is to have a resolution of a picosecond, the variation in the characteristic lengths of the signal path may be reduced to less than 300 microns (which corresponds to the distance traveled in a picosecond at the speed of light).

Figures 2A, 2B:
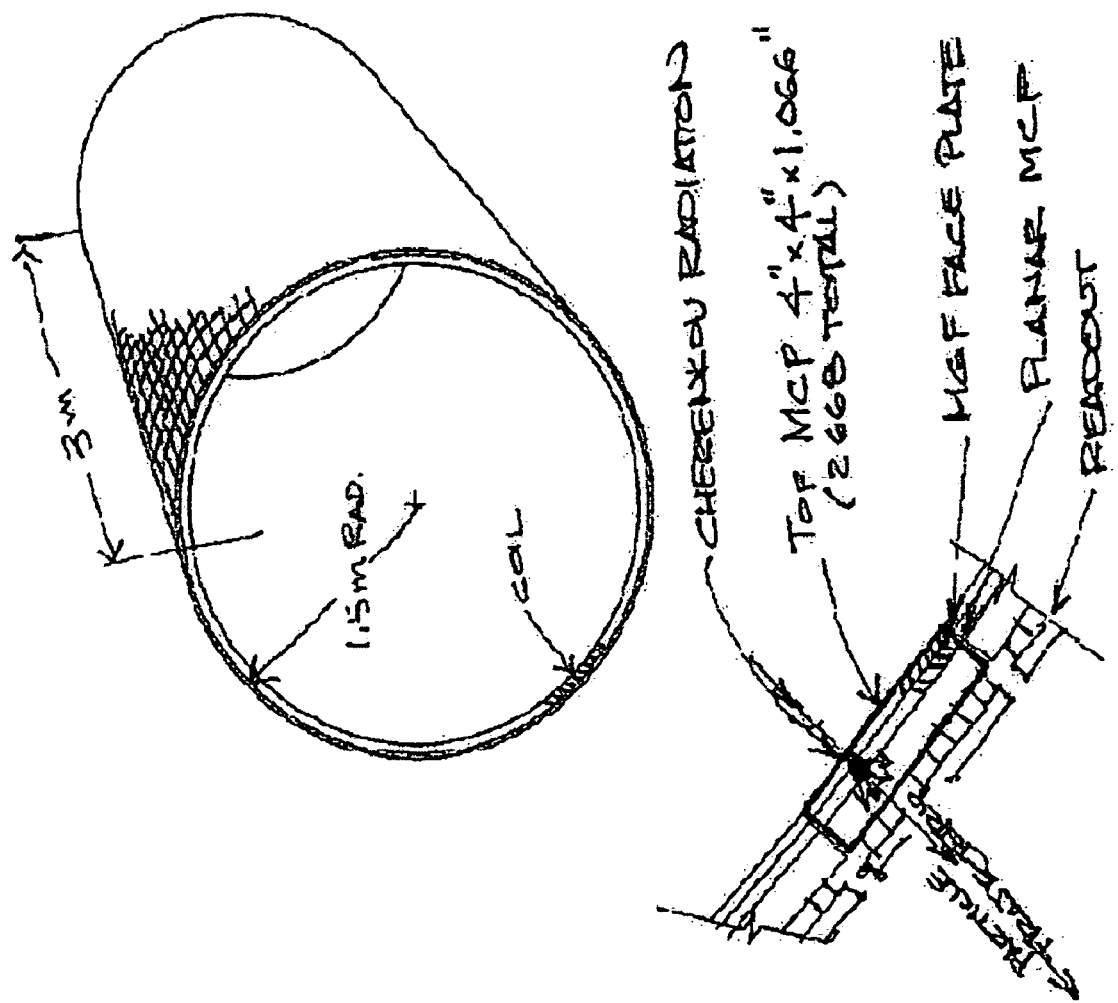
FIG. 2A is an example of a time-of-flight system with the photodetectors surrounding the collision vertex in a cylindrical array.
FIG. 2B is an example of a portion of one photodetector depicted in FIG. 2A

One example of a time-of-flight system is depicted in FIGS. 2A-2B. Specifically, a plurality of photodetectors may surround the collision vertex, such as in a cylindrical array as shown in FIG. 2A. The particles may travel directly through the photodetector itself, as shown in FIG. 2B, generating Cherenkov light. The Cherenkov light, produced by the impact of the particle, may be amplified by the MCP, as discussed in more detail below with respect to FIGS. 3A and 4. As shown in FIG. 2A, the individual units may be placed in an economical manner in a pattern side-by-side. This arrangement of individual MCP units to make a large area array comprises "tiling," i.e., placing individual units side-by-side in a pattern much like tiles on a bathroom wall. For the large cylindrical detectors used in high energy physics (HEP), the tiling may be on the surface of a cylinder, as shown in FIG. 2A. FIGS. 2A-2B depict a typical layout in a large HEP collider experiment. Space in the radial direction is at a premium so that the thinness of the radiator/MCP geometry of this design is advantageous.

As discussed above, one of the factors contributing to the accuracy of time-of-flight systems is the uncertainty in detecting charge on the anode. Specifically, the path length for detecting the charge on the anode may vary due to where the charge sits on the anode. For example, in a large anode (such as a 2 in×2 in anode) with a transmission line in the middle of the anode, the path length for charge in the middle of the anode is shorter than the path length for charge at the edge of the anode. This leads to significant variations in the path lengths.

The design described below may reduce or minimize the path length uncertainty in detecting a signal on the anode by segmenting the anode and including transmission lines (or similar circuitry) whose transit time between the segments of the anode and the electronics that determine whether there is charge on the anode is less than a predetermined amount. For example, if the transit time is 300 microns in 1 psec and a resolution of 1 psec or less is desired, the transmission lines from the segmented pads of the anode to the electronics may vary less than 300 microns in order to obtain the desired resolution. In this manner, the length of the transmission lines (or similar circuitry) from each segmented pad of the anode to the electronics may vary from one another by no more than 300 microns (if 1 psec is the desired resolution) if the transmission lines have the same characteristics (composition, dielectric, etc.). Alternatively, if transmission lines from the segmented pad of the anode to the electronics use different characteristics (e.g., one transmission line uses a dielectric which is different from a second transmission line), the lengths of the transmission lines may be selected such that the transit time between the different transmission lines does not vary more than a predetermined time or a predetermined distance (such as 1 psec or 300 microns). The anode may thus be termed an "equal-time anode" when the transit time through the transmission lines from the pads to the electronics is equal or less than a predetermined metric.

The equal-time anode may be used with a large-area array composed of individual units capable of high resolution (psec) time measurements of Cherenkov light made by particles traversing a thin radiator at the face of a MCP. Using the equal-time anode, such as described below, obviates the need for a system with too great a number of electronics readout channels to be feasible mechanically, electrically, and financially. Further, the performance, as predicted by simulation, is an order of magnitude better than has been previously achieved. Thus, the equal-time anode may deliver a signal at a time that is independent of position of the charge on the anode. The anode allows a single electronics channel to cover an area much larger than corresponds to the time resolution, making an array covering the area of a typical apparatus feasible.

In addition to the equal-time anode, a light-guide mask for full-area coverage may be used. The MCP modules may have an active area that is smaller than the physical area of the overall device. This may lead to "dead" areas, insensitive to particles, and hence a reduced efficiency for particle identification. To solve this problem, a "mask" of transparent radiating material (for example, fused silica), that covers (or substantially covers) the dead areas or interfaces between the modules and transports the light to the active regions. There may be some degradation in timing performance, but this may be corrected with post-processing from the position of the track of the particle.

The present detectors separate pions from kaons only for momenta less than a few GeV. This is limited either by the resolution on the angle of light in the Cherenkov technique or the time resolution in the time-of-flight. Of the two, improving the inherent time resolution is the easier; using the equal-time anode enables a potential improvement by a factor of approximately 100, allowing a factor of 10 increase in momentum reach for the particle separation.

Cherenkov Radiation

Cherenkov radiation is produced by a charged particle in a medium when the velocity of the particle exceeds the velocity of light in that medium. Since the velocity of light in a medium is c/n, where n is the index of refraction, Cherenkov light will be produced whenever v>c/n, or using $\beta \equiv v/c$, $\beta n>1$. This radiation is produced essentially instantaneously. In the limit of an infinite radiating medium, it forms a coherent wavefront in the shape of a cone. A little geometry shows that the Cherenkov cone must have an opening half angle of $\pi/2-\theta_c$, where $$\cos \theta_C = \frac{1}{\beta n} \quad (1)$$

Since the simulations discussed below include the thickness of the radiator on the order of 1000 times the wavelength of the radiation in question, the infinite radiator approximation is valid.

Cherenkov radiation is 'blue'; that is, there is more energy in the shorter wavelengths. The number of photons radiated per wavelength per distance is $$\frac{\partial^2 N}{\partial x \partial \lambda} = \frac{2\pi Z^2 \alpha}{\lambda^2}\left(1 - \frac{1}{\beta^2 n(\lambda)^2}\right) \quad (2)$$

where Z is the charge of the particle (in multiples of e) and $\alpha$ is the fine structure constant. As a rule of thumb, the number of visible photons radiated per centimeter is $\partial N/\partial x = 400 \sin^2 \theta_C$. Cherenkov light may therefore be used for fast timing, such as beam diagnostics.

Detection

There may be several factors that affect the time resolution of the detector. The first may comprise the spread in the arrival of the electromagnetic radiation (such as the Cherenkov radiation) to the photocathode. When the charged particle reaches the back edge of the radiator, the radiation produced at the end of its path may also be at the back edge of the radiator. Working out the geometry, one may show that a photon emitted a distance x from the back of the radiator may still have to cover a distance $d=x(\beta n-1/\beta n)$ to reach the end of the radiator when the charged particle exits the radiator. Thus, in a radiator of thickness T, the first photons emitted will arrive $$\Delta t = \frac{T}{\beta c}(\beta^2 n^2 - 1) \quad (3)$$

after the last photons emitted. Since the photons are emitted uniformly along the path of the charged particle, they will arrive uniformly, neglecting absorption, during the interval $\Delta t$.

Another factor in the time resolution of the detector may include the single photon transit time spread (TTS), or jitter, associated with MCP itself. The time it takes from the creation of a photo-electron to the production of a signal may vary slightly from trial to trial. Some of this variation may be due to the differences in path length of the first photo-electron, or may be due to uncertainties inherent in the MCP itself. The best detectors currently on the market have transit time spreads of tens of picoseconds.

Still another factor (as discussed above) may include the path length variation as the electrical signal travels through the anode to electronics that determine whether there is charge on the anode, such as a central collector. To minimize the effect on time resolution, a multianode design as presently described is disclosed whereby the anode is subdivided. For example, a 2 in×2 in anode may be subdivided into 400 pads, with a separate readout for each 100. The signals from each of the 100 pads per quadrant may be routed to the central collector through transmission lines of equal length (or length which varies less than a predetermined amount) and equal time delay (or time delay which varies less than a predetermined amount). Another example of an anode may include a 2 in×2 in anode subdivided into 1024 pads, with a separate readout for each 256 (four collection points). Or, there may be a higher or lower number of collection points for the anode. For example, there may be 16 collection points for the anode. In the example of 1024 pads, this results in 64 transmission lines electrically connected to a single collection point. As another example, there may be a single collection point in the anode so that all of the transmission lines for the anode are electrically connected to the single collection point.

In optimizing the design of the anode, the pad-to-transmission line relationship and the transmission line-to-collection point relationship may each be independently optimized. For example, each pad may be connected to a single transmission line in a one-to-one relationship. Or, a greater number of pads may be connected to a lesser number of transmission lines. For example, two pads may be electrically connected to a single transmission line (so that there is a two pad to one transmission line relationship). As another example, four pads may be electrically connected to a single transmission line. Where reduction in the number of transmission lines is sought, the pad-to-transmission line relationship may be increased (e.g., from a one-to-one relationship to a four-to-one relationship, resulting in ¼ the number of transmission lines). As another example, the number of connection points in the anode may vary. In the example described above, there are four collection points, so that one-fourth of all of the transmission lines are routed to a single collection point (e.g., in an anode of 1024 pads with a one-to-one pad to transmission relationship, 256 transmission lines are routed to a single collection point). The number of collection points may be greater or less than four. Thus, the number of collection points may be selected such that the distance that the transmission lines may be reduced or increased. A smaller number of collection points may result in a longer distance of the transmission lines whereas a greater number of collection points may result in a shorter distance of the transmission lines.

Figure 3A:
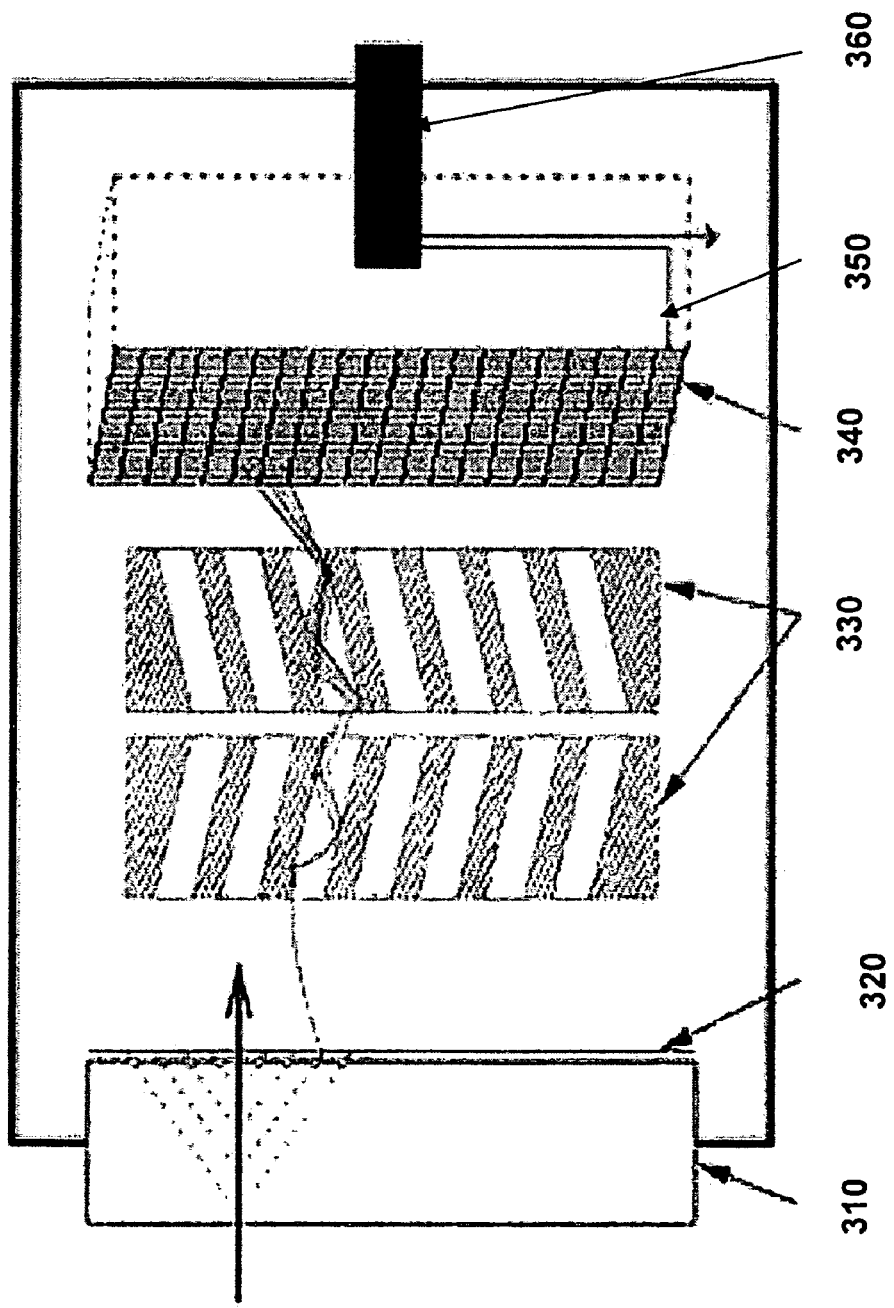
FIG. 3A depicts an example of a schematic of a portion of a photodetector including a window, a photocathode, a chevron micro-channel plate, a multi-pad anode, transmission lines, and a pin that penetrates the back of the device to the readout chip.
Figure 3B:
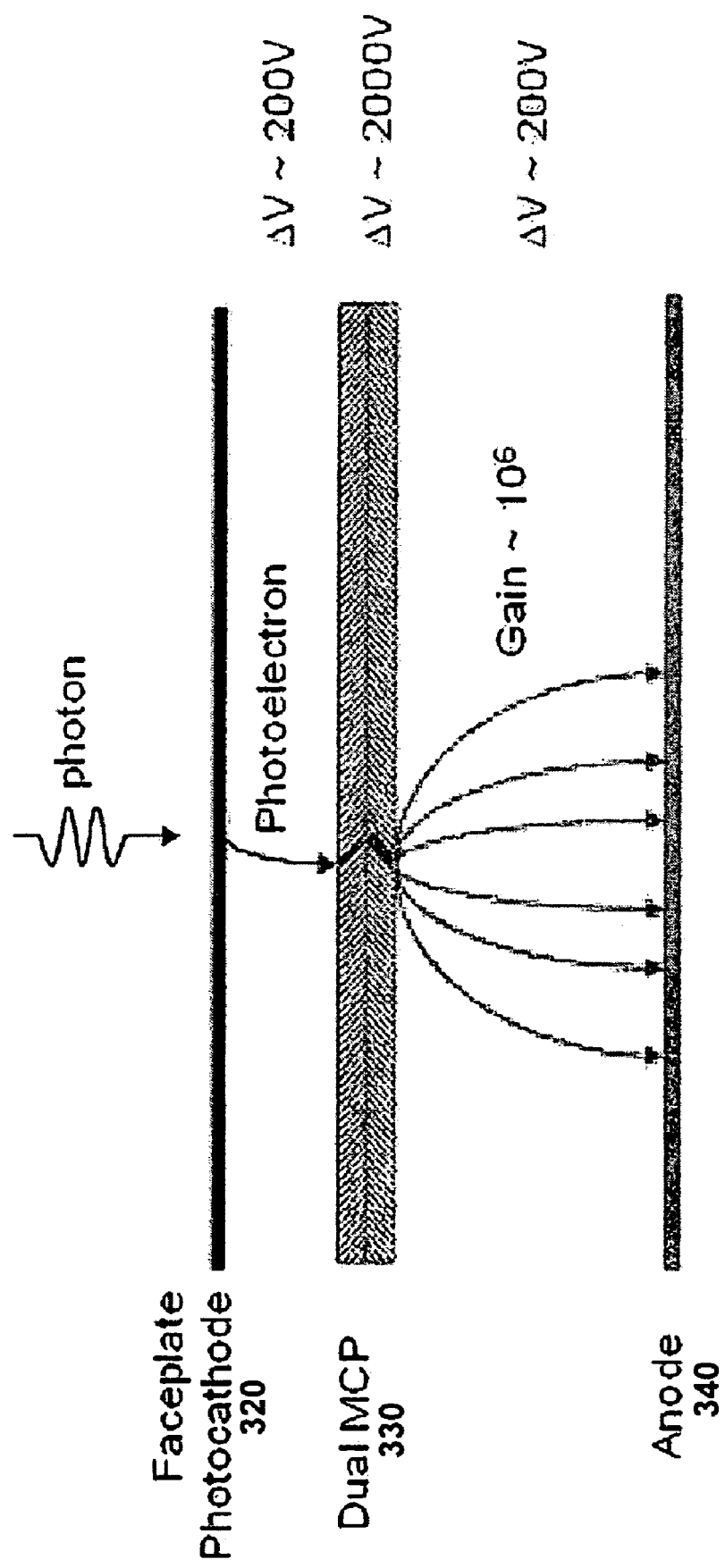
FIG. 3B depicts side view of a portion of the photodetector, including example voltage drops across the photocathode, the micro-channel plate, and the multi-pad anode.

FIG. 3A depicts a schematic of a side of a MCP module, showing the window 310 (which may comprise magnesium fluoride or fused silica), a photocathode 320, followed by the chevron micro-channel plate 330, the multi-pad anode 340, the transmission lines 350, and the pin 360 that penetrates the back of the device to the readout chip. The actual thickness of the module may be approximately 1 inch, so that the true aspect ratio is more akin to a tile than akin to the exploded view as shown in FIG. 3A. FIG. 3A also shows an incoming particle making Cherenkov light in the window, and the trajectory of one photo-electron and its shower in the MCP. Typical gains, however, are approximately $10^6$, rather than the small integer depicted in the electron shower. FIG. 3B depicts side view of the MCP module, including example voltage drops across the photocathode 320, the micro-channel plate 330, and the multi-pad anode 340.

Figure 4:
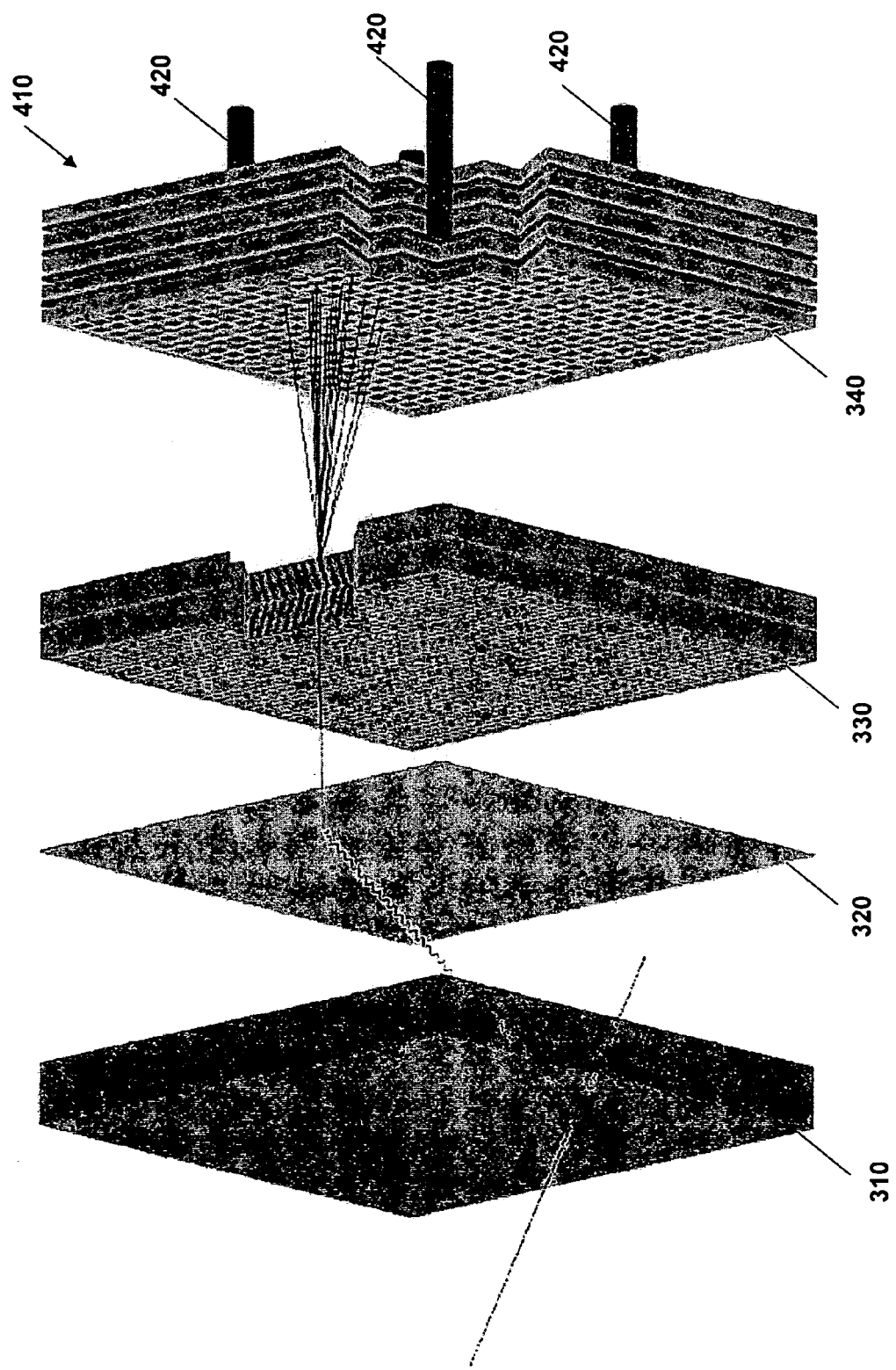
FIG. 4 shows an exploded view of one example of the design of an equal time anode.

FIG. 4 shows an exploded view of one example of the design of the equal time anode. Window 310 is shown, with photocathode 320, and micro-channel plates 330. The anode circuitry is shown as element 410, with top layer 340 being the actual (electrical) anode, and may include 2 mm square metallic pads. This is the layer that receives the charge output from the micro-channel plate. As shown in FIG. 4, the anode circuitry 410 may include multiple layers, so that the multiple transmission lines may be electrically connected to the connection point. Where a greater number of collection points are used, fewer layers for element 440 may be required.

Figure 5:
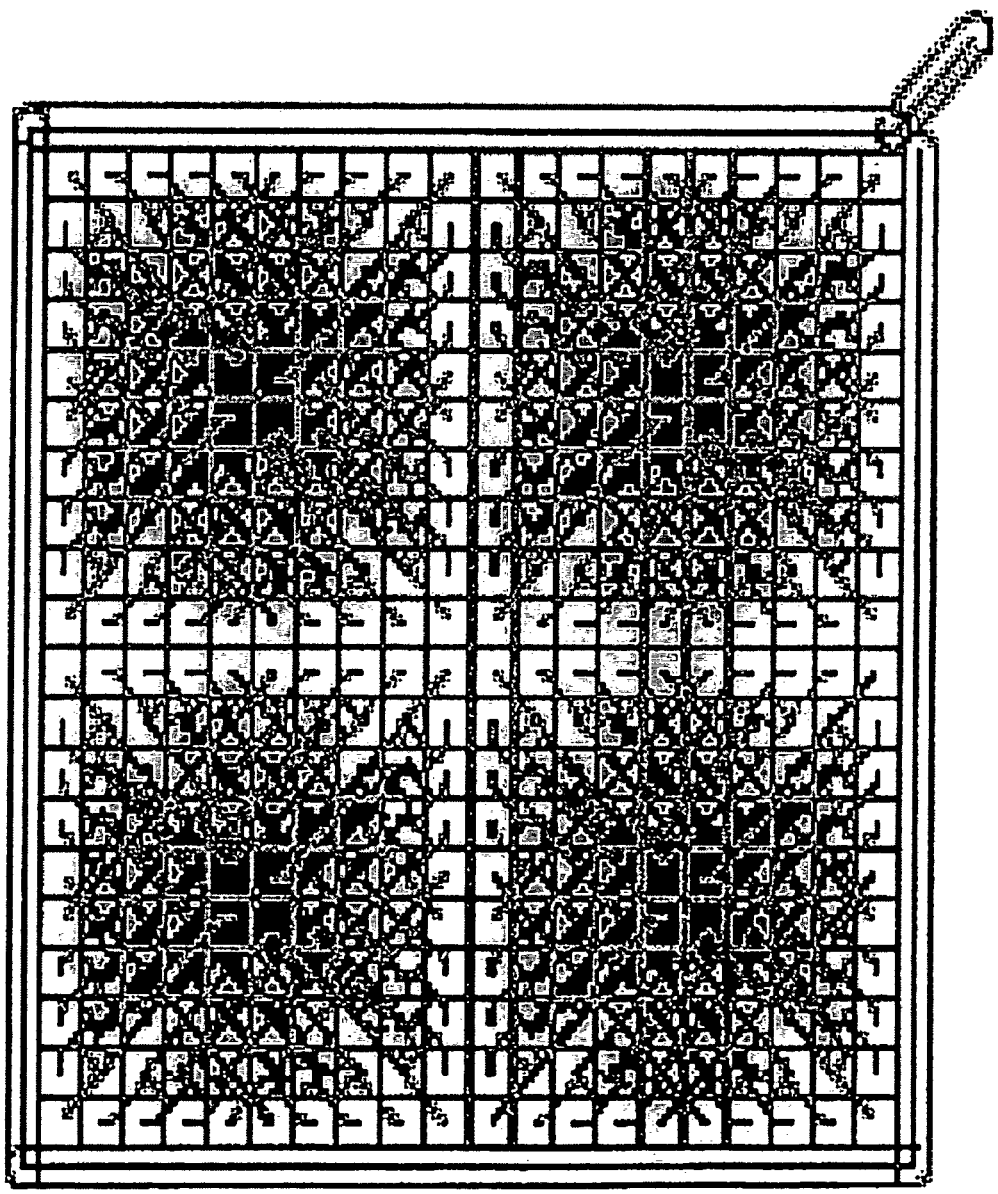
FIG. 5 shows an example of the layout for the transmission lines for an equal-time anode.

The two layers of transmission line traces and their corresponding ground planes are also shown; these are constructed so that the transit time of the charge from each pad to the respective one of four central collection points is constant (or less than a predetermined amount). As shown in FIG. 5, the anode may be segmented and the collection points may be approximately at the center of each large square. Alternatively, the collection points may be placed off-center. Each of these collection points may have a pin through the anode assembly that may connect directly to the readout chip. As shown in element 420 of FIG. 4, there are 4 pins. Fewer or greater pins may be used. The bulk material may be ceramic; this may form the seal to the back of the glass envelope of the full MCP assembly.

Figure 10:
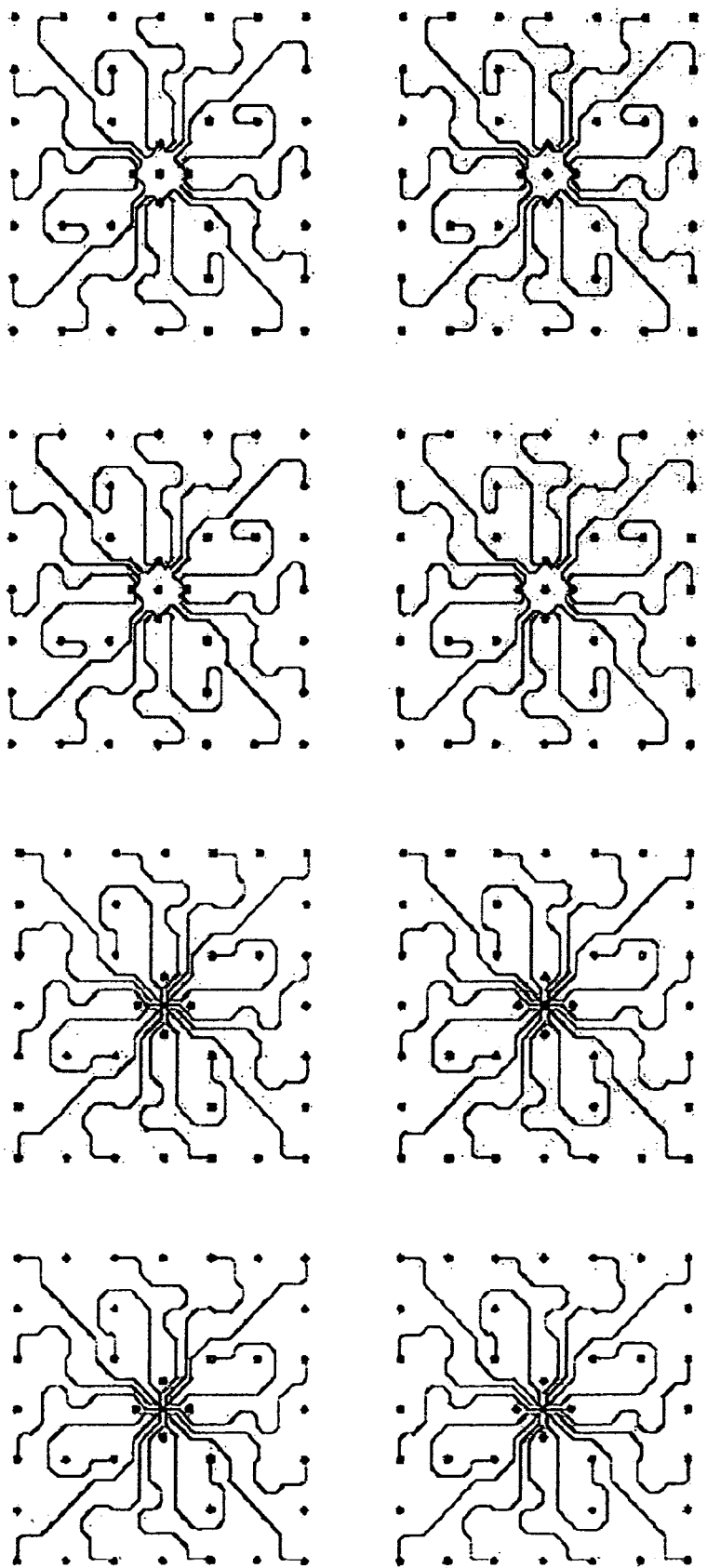
FIG. 10 is another example of a layout of the transmission lines on two neighboring layers of the multi-layer equal-time anode.

One example of the layout of the transmission lines that connect the individual pads to the collection point is shown in FIG. 5. Another example of the layout of the transmission lines is shown in FIG. 10. The transmission line design of the layout of the board may be performed in a variety of ways. For example, the design may use several constraints including the following features: the distance between routes may increase radially (so that far from the collector the routes would be far apart); the lengths of each route may be close; adjacent pads may be routed to different layers (to control for differences between the route layers); and the routes may be simple enough to be easily produced. In addition, the routes may obey other constraints for high frequency traces (e.g., no corners, etc.).

Figure 6:
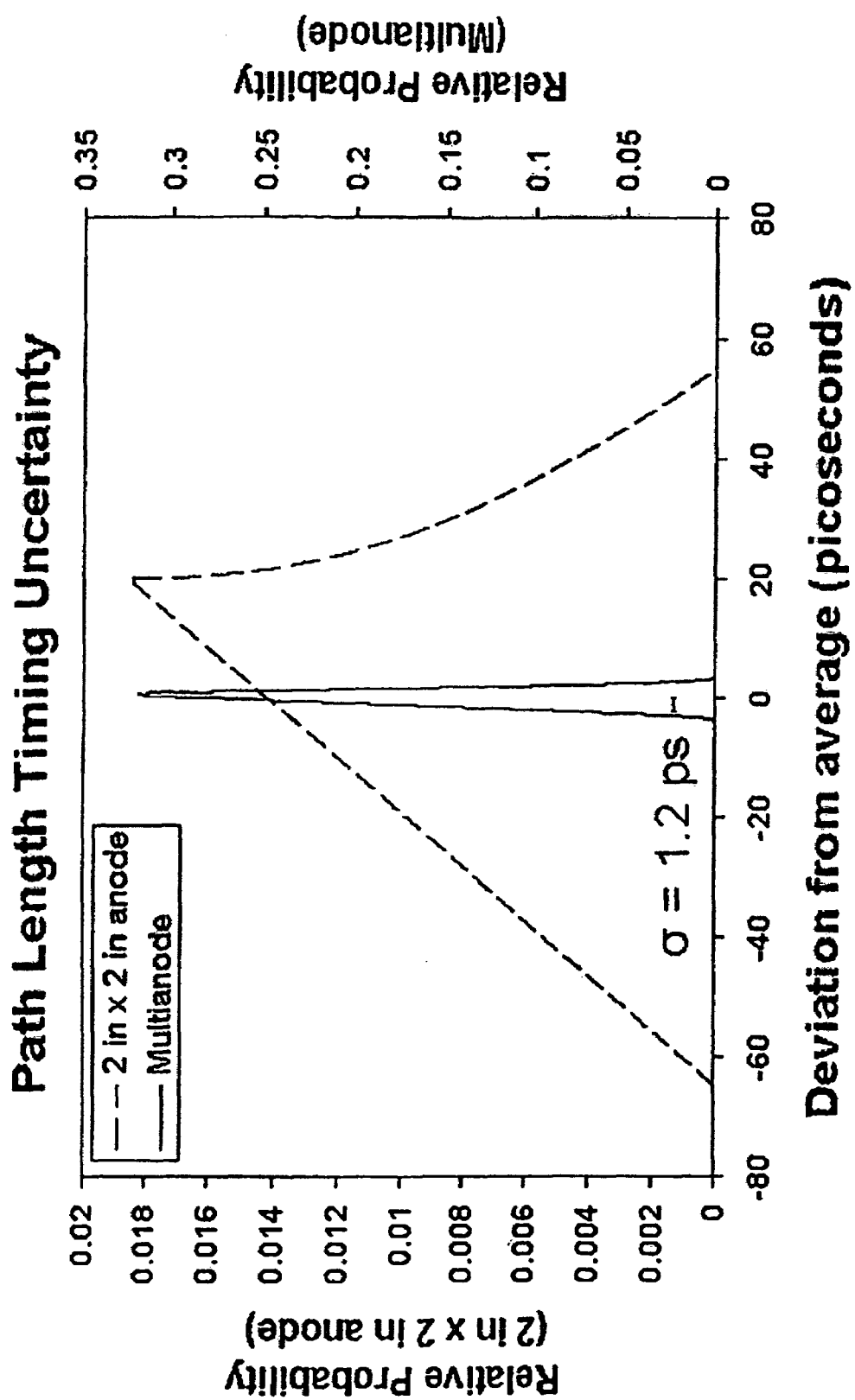
FIG. 6 is a graph showing the timing distribution resulting from path length differences on the anode.

FIG. 6 graphically shows the timing distribution resulting from path length differences on the anode. As shown in FIG. 6, while the root-mean-squared (RMS) time spread for a 2 inch×2 inch anode may be as severe as 48 ps (not including the effect of reflections, which may also be severe), the multianode layout (including the transmission lines of equal length) shrinks path length uncertainty to 1.2 ps. Thus, FIG. 6 shows the dispersion in timing resulting from path length difference on the anode. The multi-pad anode may therefore be important to achieving the time resolution performance.

The design of a finely segmented anode (the collector of the charge output by the MCP) may solve the problem of time dispersion in the anode that would otherwise destroy the time resolution. Simulations outlined below predict performance in time resolution of the equal-time layout. These simulations may take into account stray capacitance and inductance, length and impedance of lines and connectors and input pins on components, and component characteristics. As shown, the simulation predicts a resolution of 1 psec.

An additional application may include adding a layer of silicon detectors and a photon converter in front of the photo devices. This configuration may solve the problem of associating photons with their parent vertices in events with multiple vertices. Multiple vertices may be the mode at high intensity colliding beam accelerators, such as the LHC at CERN.

Figure 7:
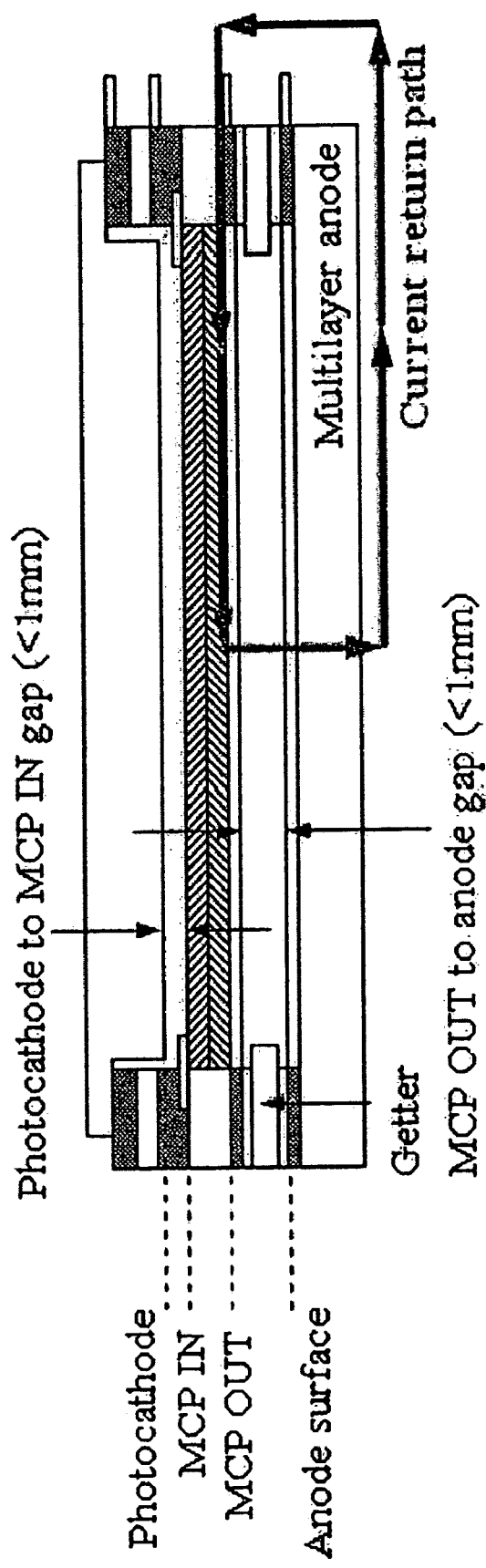
FIG. 7 depicts a schematic of the current return path with a grid capacitively coupled with the micro-channel plate.

Another problem affecting the resolution of the detector may be referred to as the return-path problem. Charge may be deposited on the anode indicating that a photon has impinged on the detector. In order to sense the charge on the anode, a return path is created in the detector for the charge to flow to the electronics. In the configuration described in FIGS. 2A-2B, 3A-3B, and 4 is back to the MCP-OUT. The current return-path is shown schematically in FIG. 7. As discussed above, for a large-diameter MCP, the path may be long, resulting in a path impedance that may seriously degrade the signal time characteristics of the detector. Specifically, the path for current flow goes across the anode, up the side of the MCP, and back across the MCP-OUT plane to the pores that are the source of the charge (depicted as the black line in FIG. 7).

When the dimensions of the MCP are large (such as in 2 in×2 in MCP modules), the return path creates several problems in the time resolution of the detector. First, viewing the generation of the signal path as a circuit, the inductance of the circuit dominates the rise time of the signal, and hence may adversely affect the time resolution of the detector. Second, because the MCP may be large, the return path may vary depending on where in the MCP-OUT plane the pores reside (e.g., pores residing at the edge of the MCP-OUT may result in a shorter return path and pores residing in the middle of the MCP-OUT may result in a longer return path). This variance in the return path similarly affects the time resolution.

In order to reduce the effects of the return-path problem, the anode and return path may be specially designed so that the electrical properties preserve the advantages of the fast timing of the detector, and the small pores and short electron shower path lengths in the MCP. One way to create a shorter and less variant return path is to include a circuit element that is at least partly capacitive to couple the anode to the MCP-OUT (or another part of the detector that the anode receives the charge from a charge emitter). The circuit element may be proximate to a part of the anode (such as being in the same layer as the pad or pads of the anode). For example, the circuit element may partly or fully encircle one, some, or all of the pads of the anode, such as a grid structure or strips. Specifically, the grid structure in the pad plane may connect to the T side of each transmission line near the pad connected to its corresponding T. The grid may act as a capacitor and capacitively couple to the MCP-OUT and provide the AC return path. The grid may also be AC-coupled to the input to the Time-to-Digital Converter (TDC) chip so that it may be held at some fraction of the potential of MCP-OUT (such as being held at the same DC potential as MCP-OUT) by a divider on the HV. Thus, charge from the MCP-OUT is more likely to be directed to the anode (as opposed to the grid) since the grid is held at the same potential as the MCP-OUT.

In this manner, the inductance of the circuit with the grid (e.g., the MCP-OUT (that emits the charge), the grid, the anode, and the electronics) is less than the inductance of the circuit without the grid (e.g., the MCP-OUT, the grid, the anode, and the electronics). Further, the circuit path length of the circuit with the grid (e.g., the MCP-OUT (that emits the charge), the grid, the anode, and the electronics) is less than the circuit path length of the circuit without the grid (e.g., the MCP-OUT, the grid, the anode, and the electronics). Finally, the variations in the circuit path length of the circuit with the grid is less than the variations in the circuit path length of the circuit without the grid. Specifically, since the grid encircles the pad(s) (and is therefore close to any charge that is placed on the pad(s), the circuit path length is less than without the grid and the circuit path length varies less than without the grid.

Figure 11:
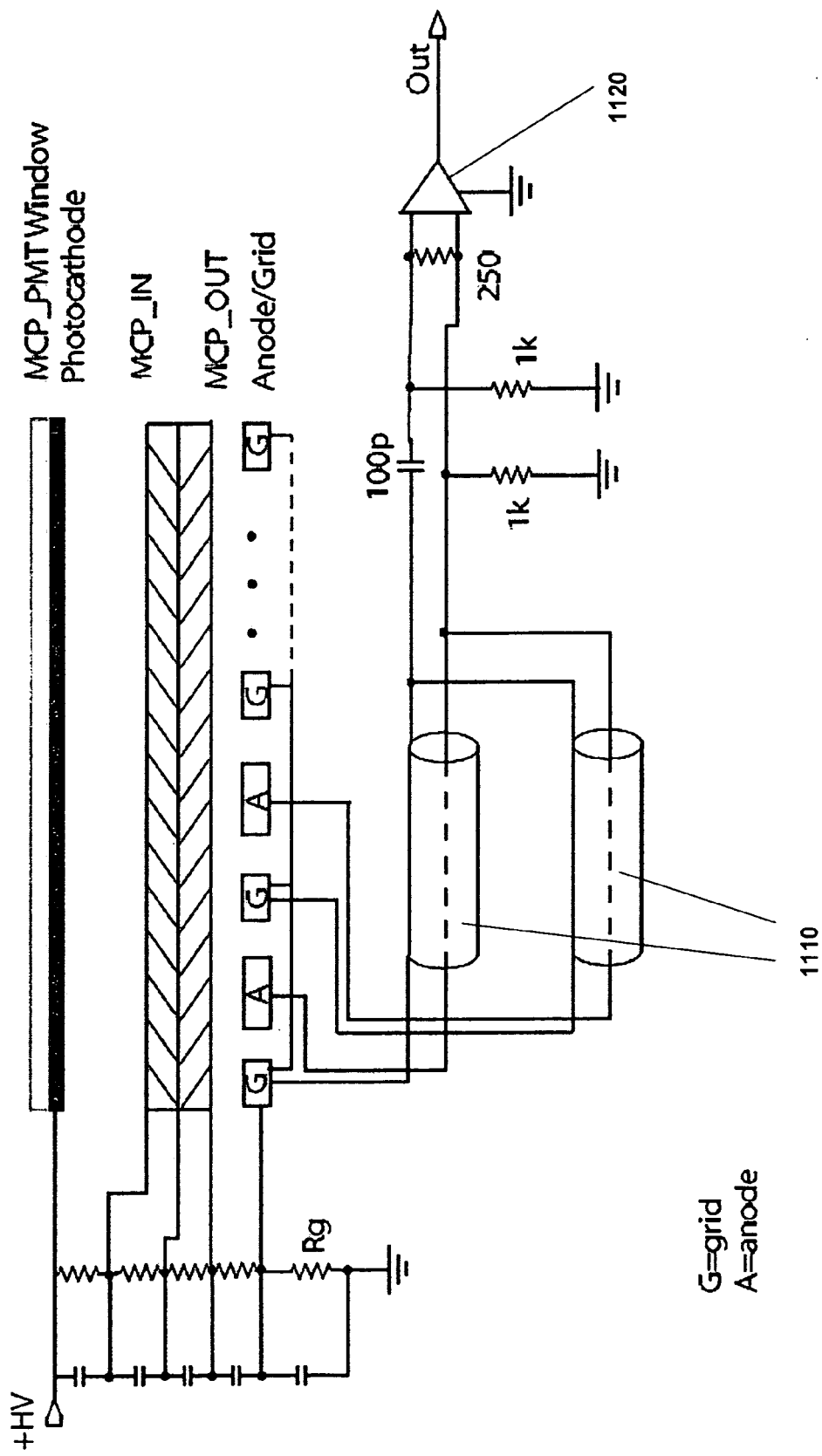
FIG. 11 is an example schematic of the signal circuit showing the grid and its biasing network, the anode signal paths, and the transmission lines to the front-end electronics.

Other properties of the detector to reduce the effects of the return path problem include:

(1) reducing the distance between MCP-OUT and the anode plane (see FIG. 7) to create a capacitive return path back to MCP-OUT;

(2) including a multi-anode structure of, for example, 8-by-8 pads organized into 4 readout channels, with each channel being a quadrant of the anode (giving 4 1 in×1 in pixels per MCP module);

(3) surface mounting each TDC chip on the back of the anode (with the input to the TDC chip being differential, one side (S) being the OR of the pad side of the 16 transmission lines (the T lines) and the other side ($\bar{S}$) the OR of the respective grid lines (the $\bar{T}$ lines, as shown in FIG. 11); and (4) the equal-time anode. Specifically, transmission lines may be used to transmit the charge from the segmented anode (such as from each of the 16 anode pads in a quadrant) to a common collection point. The transmission lines may be constructed with two traces on separate layers. In each transmission line, the conductor that connects to the pad may be called T, and its twin, the conductor that connects to 'ground', is called $\bar{T}$ (see FIG. 11). The 16 transmission lines all may be 'OR'ed together. There may consequently be an impedance mismatch which causes ringing on the lines; however, since the leading edge is the only signal of interest, and the rate of a given pixel is low, the ringing may not necessarily affect the timing.

Figures 8A, 8B:
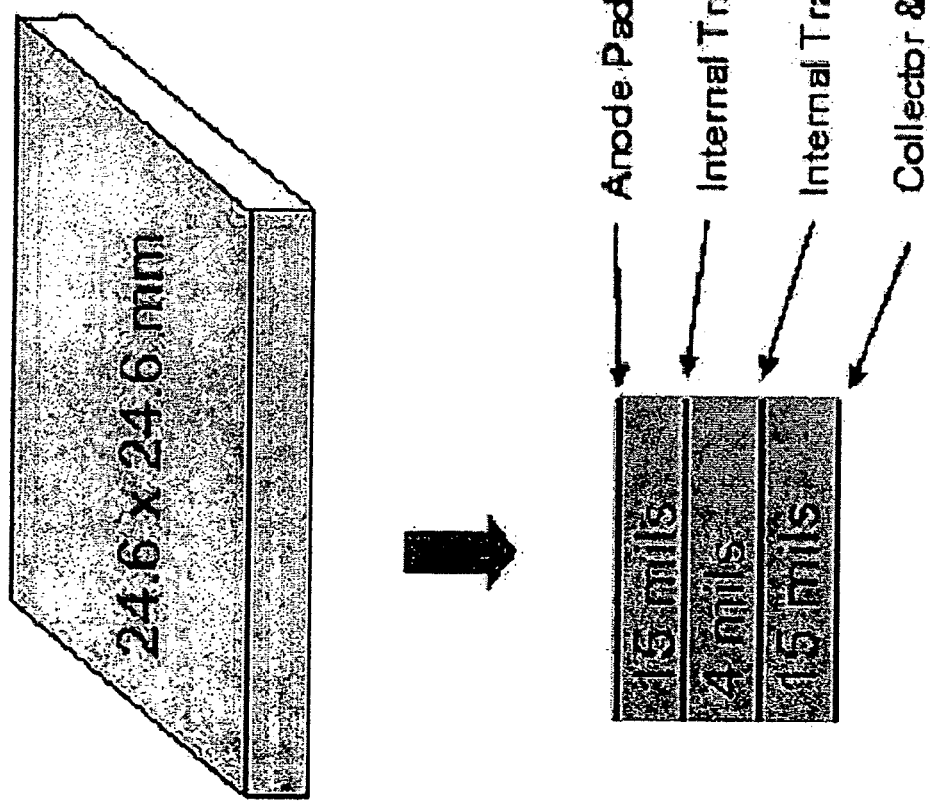
FIG. 8A is a perspective view of a schematic of the anode board.
FIG. 8B is a side view of the layer stack-up order for the anode board depicted in FIG. 8A.

FIGS. 8A and 8B show schematically an example of an anode construction. The anode may comprise a multi-layer ceramic board. The board dimensions for the anode board are shown in FIG. 8A. These dimensions are merely for illustrative purposes. The layer structure for the anode board is depicted in FIGS. 8B. Further, shown below in Table 1 is a listing of parameters for the construction of an anode board. The parameters are merely for illustrative purposes.

TABLE 1

| Board Materials | FR4 |
| --- | --- |
| Board Dimension | 24.6 × 24.6 mm |
| Board Materials | FR4 |
| Total Board Thickness | 40 mils |
| Total Stack Up Layers | 4 |
| Copper Thickness Before Plating | 1 ounce copper |
| Trace Width/Gap Width | 5 mils/5 mils |
| Total Through Hole Vias | 144 |
| Through Hole Via Drill Size | 10 mils |
| Total Buried Via (layer: 3-Layered) | 4 |
| Buried Via Drill Size | 10 mils |

Figure 9:
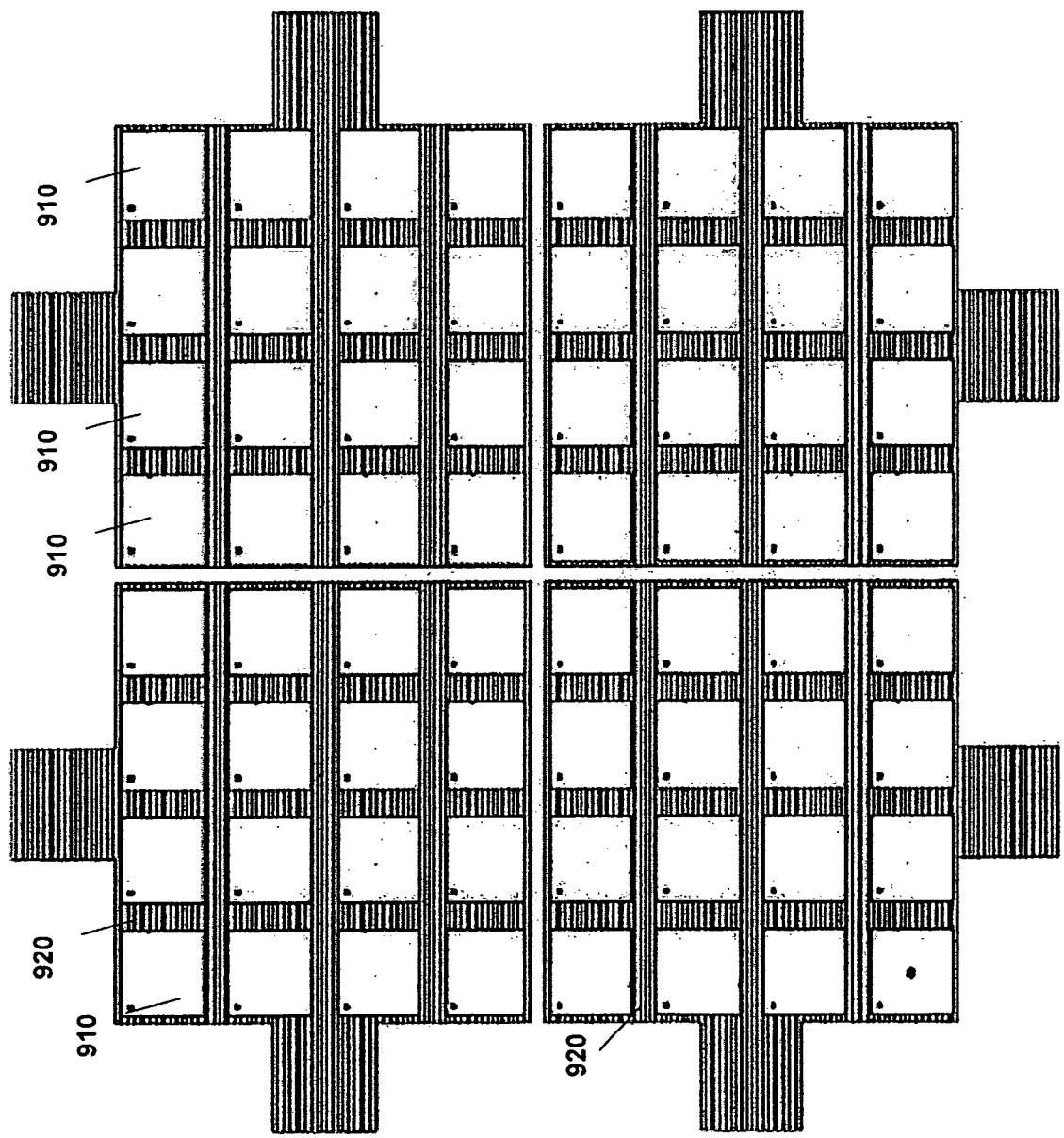
FIG. 9 is a top view of an example of the anode showing pads embedded in a grid structure.

An example of the layout of the top layer of the anode, which includes the signal pads 910 and the 'ground' grid 920 of the anode, is shown in FIG. 9. Specifically, FIG. 9 depicts a front view of the anode, showing the pads 910 embedded in the grid structure 920. As shown in FIG. 9, the grid 920 may encircle one, some, or all of the pads 910 in the respective common layer of the grid and pads. In this manner, the grid may be proximate to any edge of the pad.

Each pad 910 may feed the T side of a transmission line formed by a pair of traces on neighboring layers of the anode board (depicted in FIG. 8B), with the $\bar{T}$ trace being directly underneath the T trace. The 16 transmission lines in each quadrant may end at the signal S and its signal ground $\bar{S}$. The grid may have a large capacitance with MCP-OUT. This capacitance may shunt the inductive path and provide a fast return path. The grid may be connected to the HV distribution string and may be held at a DC voltage between ground and that of MCP-OUT (~200 Volts). The grid may also be AC-coupled to signal ground. The signal pads and signal ground may be connected on internal layers to the input to the TDC chip.

FIG. 10 depicts an exemplary layout of the equal-time transmission lines on two neighboring layers of the multi-layer anode. Each anode pad may feed the T side of a transmission line formed by a pair of traces on neighboring layers of the anode board; the $\bar{T}$ trace may be directly underneath the T trace.

FIG. 11 depicts an example of a schematic for the signal circuit showing the grid and its biasing network, the anode signal pads and the transmission lines to the front end electronics. As discussed above, the input to the TDC chip may be differential and the $\bar{T}$ line may be held at some DC potential between ground and the MCP-OUT potential. Further, the T and $\bar{T}$ lines may be AC-coupled into the TDC chip. As discussed above, the grid is in the same layer as the anode (with FIG. 11 showing the grid and the anode side by side). Thus, the grid is proximate to at least a part of the anode (such as the pad or pads of the anode). Further, as shown in FIGS. 9 and 11, a large area of the grid may face the MCP-OUT so that the grid may be capacitively coupled to the MCP-OUT. Further, because the grid has limited surface area with the anode, the capacitance between the grid and the anode may be smaller than the capacitance between the grid and the MPC-OUT. Moreover, as shown in FIG. 11, various segments of the anode may be connected to transmission lines 1110 (two of the segments of the transmission lines are shown in FIG. 11). The transmission lines 1110, as discussed above, may have transit times that vary less than a predetermined amount. For example, the transmission lines 1110 may be approximately equal in length so that the difference in the transit times through the transmission lines is less than 300 microns. Moreover, the front end electronics may include a receiver 1120 that may act as a differential amplifier. Specifically, a signal on any of the T lines of the transmission lines may contribute to a difference in the voltage at the input to the receiver 1120, indicating that there is charge on the anode. The receiver 1120 may output a signal (Out) to indicate whether there is any charge on the anode.

Figure 12:
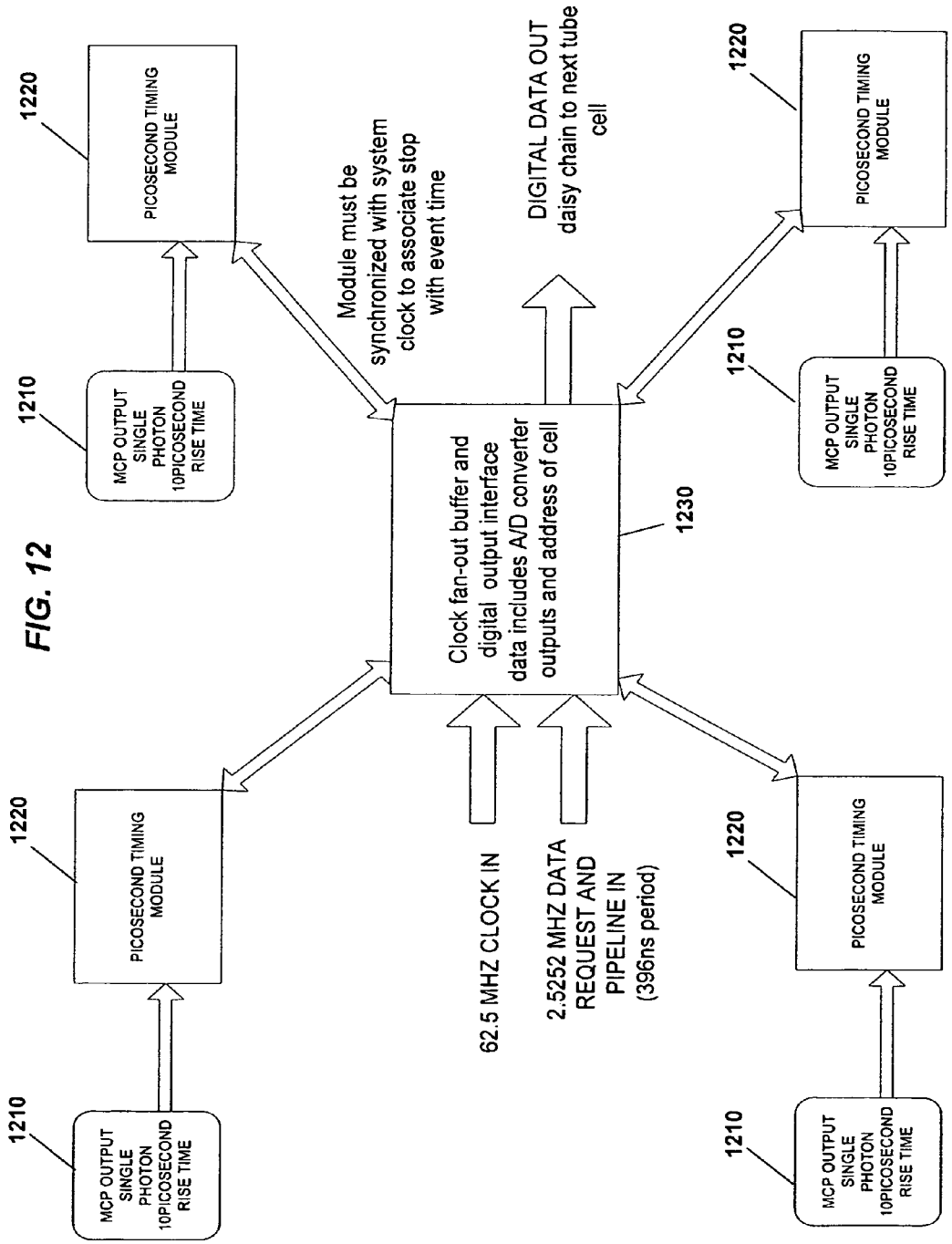
FIG. 12 illustrates an example of a timing system block diagram.

FIG. 12 depicts an example of a timing system block diagram. As discussed above, the transmission lines may connect in one or more collection points. For example, a system as depicted in FIG. 5 may include 4 collection points that may interface with the electronics to sense the charge on the pads of the anode. FIG. 12 includes 4 sets of blocks 1210, 1220 representing MCP Output Single Photon 10 psec rise time and picosecond timing module, respectively. The timing system block diagram may further include a block 1230 for clock fan-out buffer and digital output interface with data including Analog to Digital (A/D) converter outputs and address of the cell.

Simulation

In order to analyze the properties of the system, a Monte Carlo algorithm may be used to simulate the emission and detection of Cherenkov radiation. A custom design may optimize parameters like window material and thickness. In the present simulation, typical values may be used.

The simulation may split the radiator into sections in x, the distance into the radiator, and λ, the wavelength. At each point in the section, $\partial^2 N/\partial x \partial \lambda$ may be calculated. After multiplying by $\partial x \partial \lambda$, this is taken to be the probability of photon emission from that location. After randomly deciding if a photon is produced and subsequently correcting for the possibility of absorption in the window and the quantum efficiency of the photocathode, one may use equation (3) to determine the time of an electron released and geometry to determine its position on the photocathode.

Figure 13:
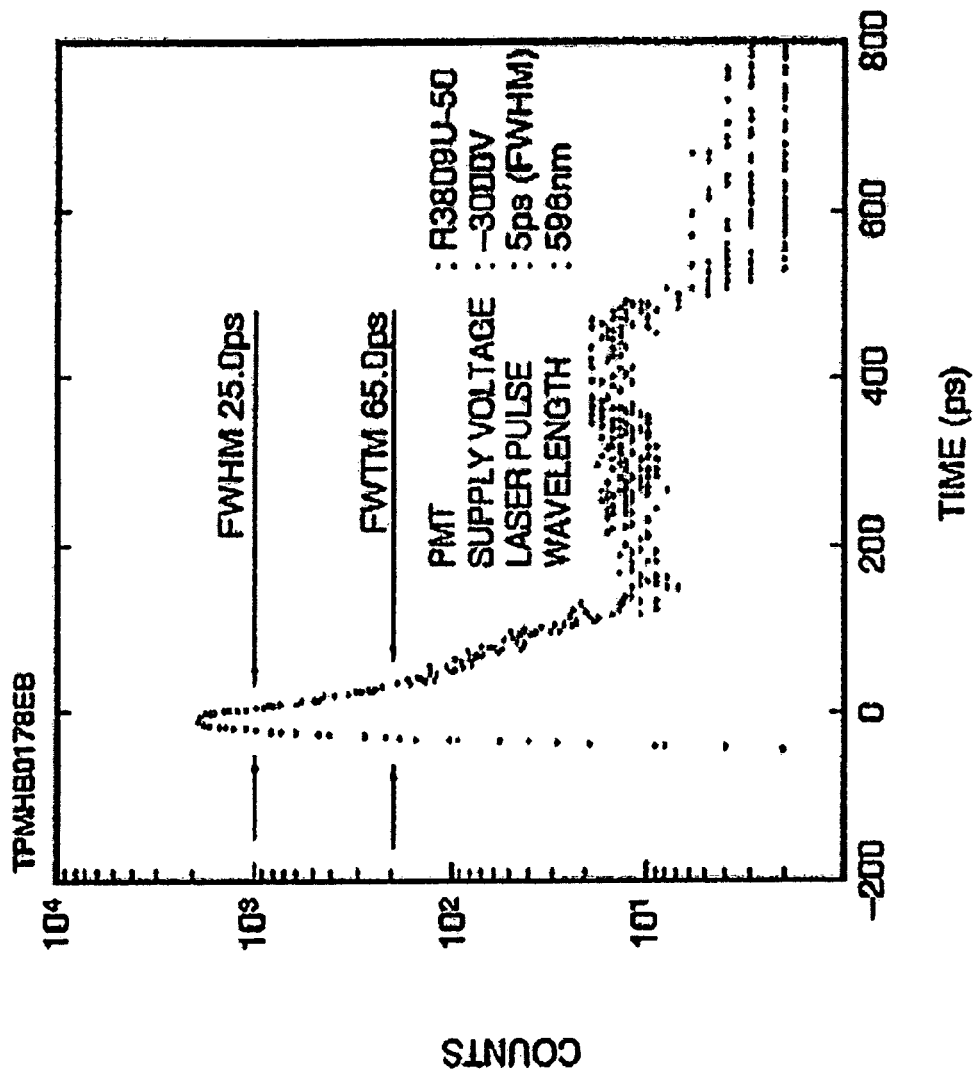
FIG. 13 graphically depicts an example of the transit time spread for a single photo-electron event.

The detectors were exposed to radiation to produce a single photoelectron and the times until the signal were plotted in a histogram, as shown in FIG. 13. Specifically, FIG. 13 depicts the transit time spread for a single photo-electron event. TTS in simulation is approximated to be a Gaussian random variable with FWHM of 25 ps. While the distribution shown in FIG. 13 is not Gaussian, the main peak is sufficiently close to approximate it as such. In order to account for the effect of MCP TTS in the simulation, a Gaussian random variable, with a mean of 0 and FWHM of 25 ps, is added to each time coordinate.

Figure 14:
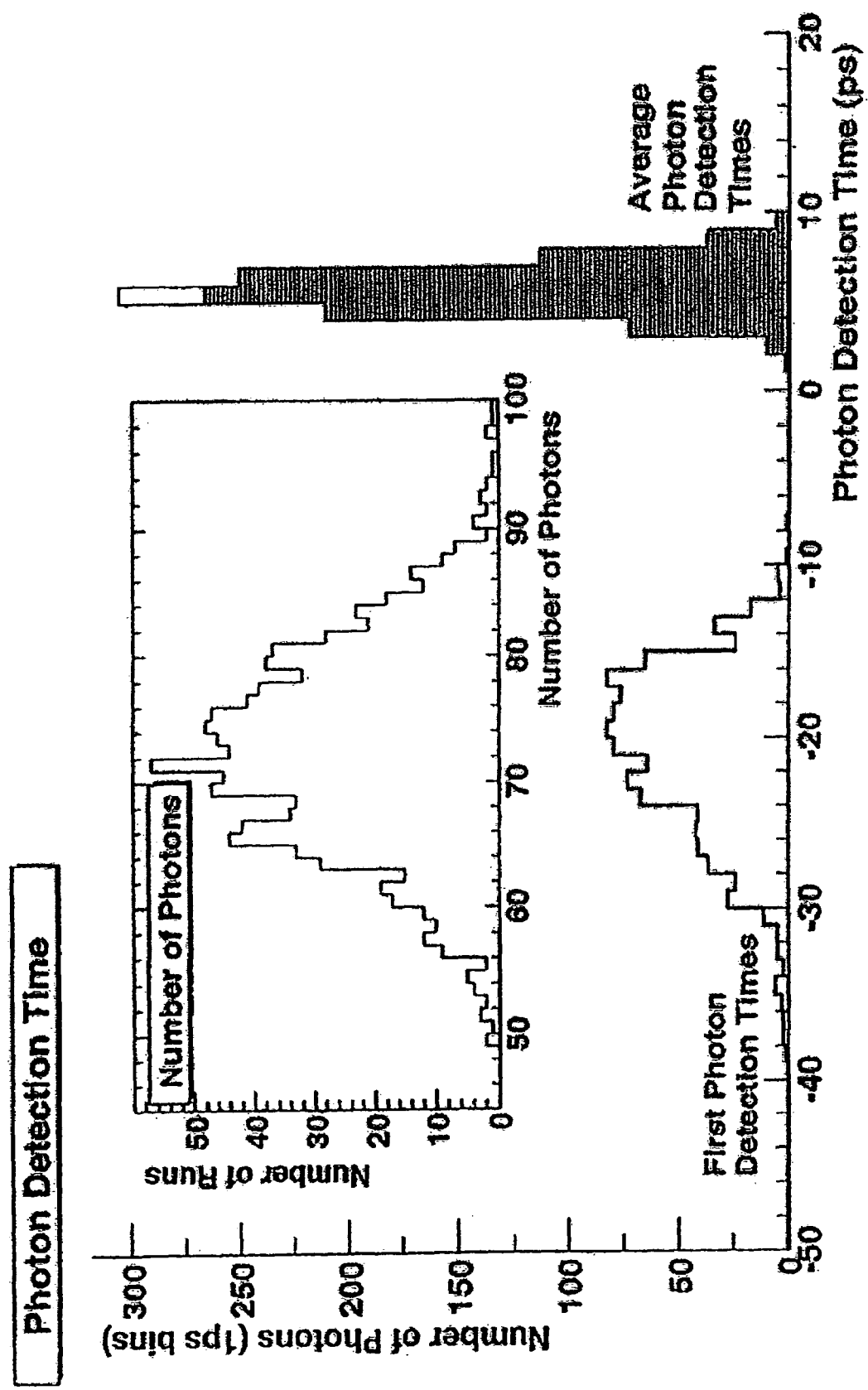
FIG. 14 graphically depicts an example of a spread in first photon detection times and average photon detections times for a set of 1000 simulations.

At this point in the simulation, the time distribution of signals arriving on the anode is examined to determine whether picosecond resolution is still possible. Three pieces of information were extracted at this stage: the first and average photon detection times and the number of signals detected. In a detector, the first two may be realized by triggering on the leading edge or using a constant fraction trigger, respectively. FIG. 14 shows a spread in first photon detection times and average photon detections times for a set of 1000 simulations. RMS average photon time is determined to be as small as 1.68 ps. Also predicted are 50-100 signals detected for each Cherenkov shower. Further, the inset in FIG. 14 depicts the number of photoelectrons detected for each of these simulations.

In order to estimate the jitter in a signal collected from the back of the anode, the electrical properties of the multianode may be simulated. After adding another random variable simulating the path length difference based on position, the signal incident on the anode is converted to a current. In making this conversion, an MCP gain of $2 \times 10^5$ may be used. Values of electrical characteristics like capacitance and inductance were assigned according to the physical geometry of the situation.

Figure 15:
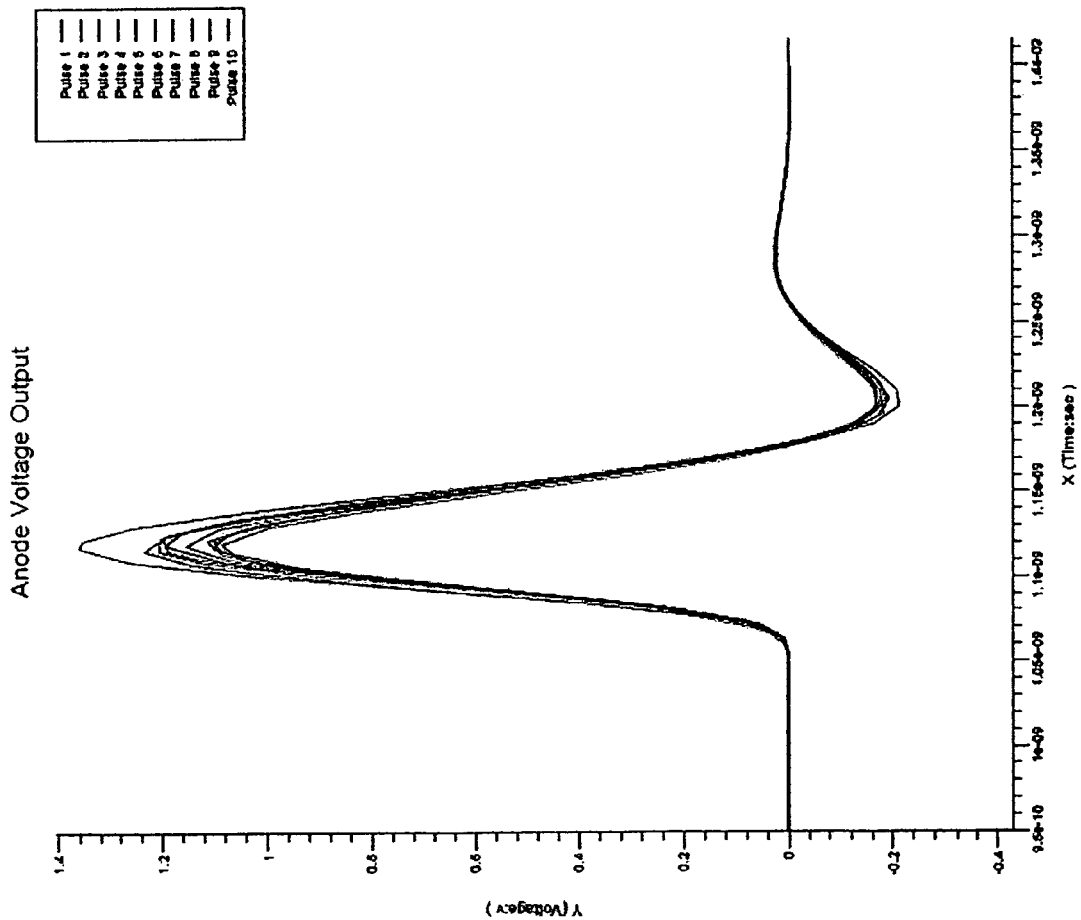
FIG. 15 graphically depicts an example of the pulse shapes at the collection pin on the back of the anode for 10 trials with the full simulation.

After obtaining shape and timing information about the pulse output, the jitter of the system may be determined according to simulation results. FIG. 15 shows the pulse shapes at the collection pin on the back of the anode for 10 trials with the full simulation. The RMS of the 10 pulses, measured at half-height, is 0.86 psec. Further optimization on the pad layout and transmission lines may be performed.

The simulations show the feasibility with current technology, indicating that a psec time-of-flight system may be constructed. In the simulation, MCPs of 2inch×2 inch were analyzed. MCPs of other dimensions may also be used. For a time-of-flight system having picosecond resolution, the system may be integrated with an inexpensive digitization and readout electronics capable of measuring 1 ps. for the Collider Detector at Fermilab, for example, may require 40,000 channels. Finally, this system may require thousands of individual detectors and may be expensive. Thus, the construction of a system for the identification of hadrons is akin to the situation in lepton identification, for which large systems have been built specifically for electron or muon identification and momentum measurement.

Figure 16:
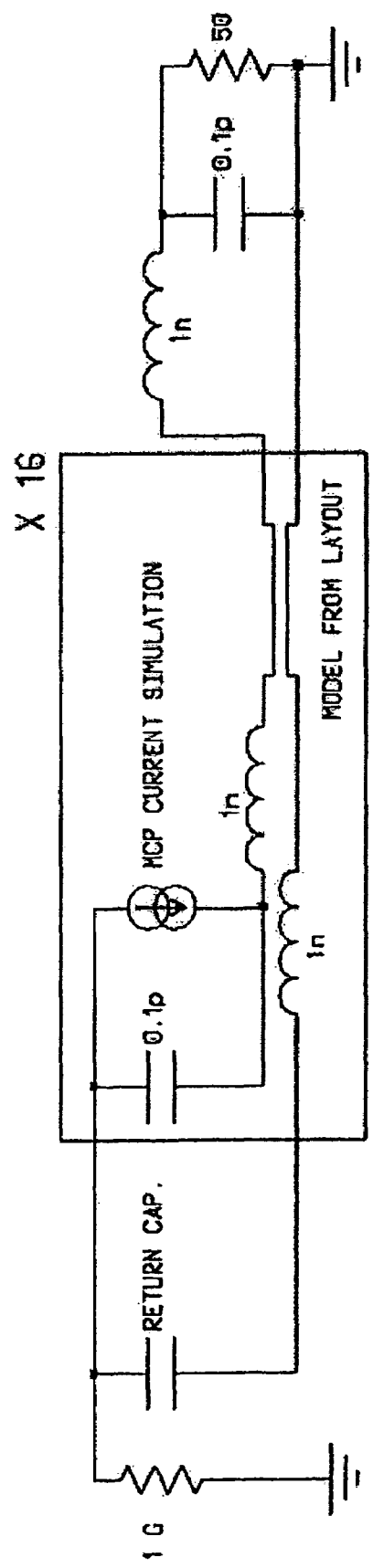
FIG. 16 is a schematic of an equivalent circuit for the return current path.
Figure 17:
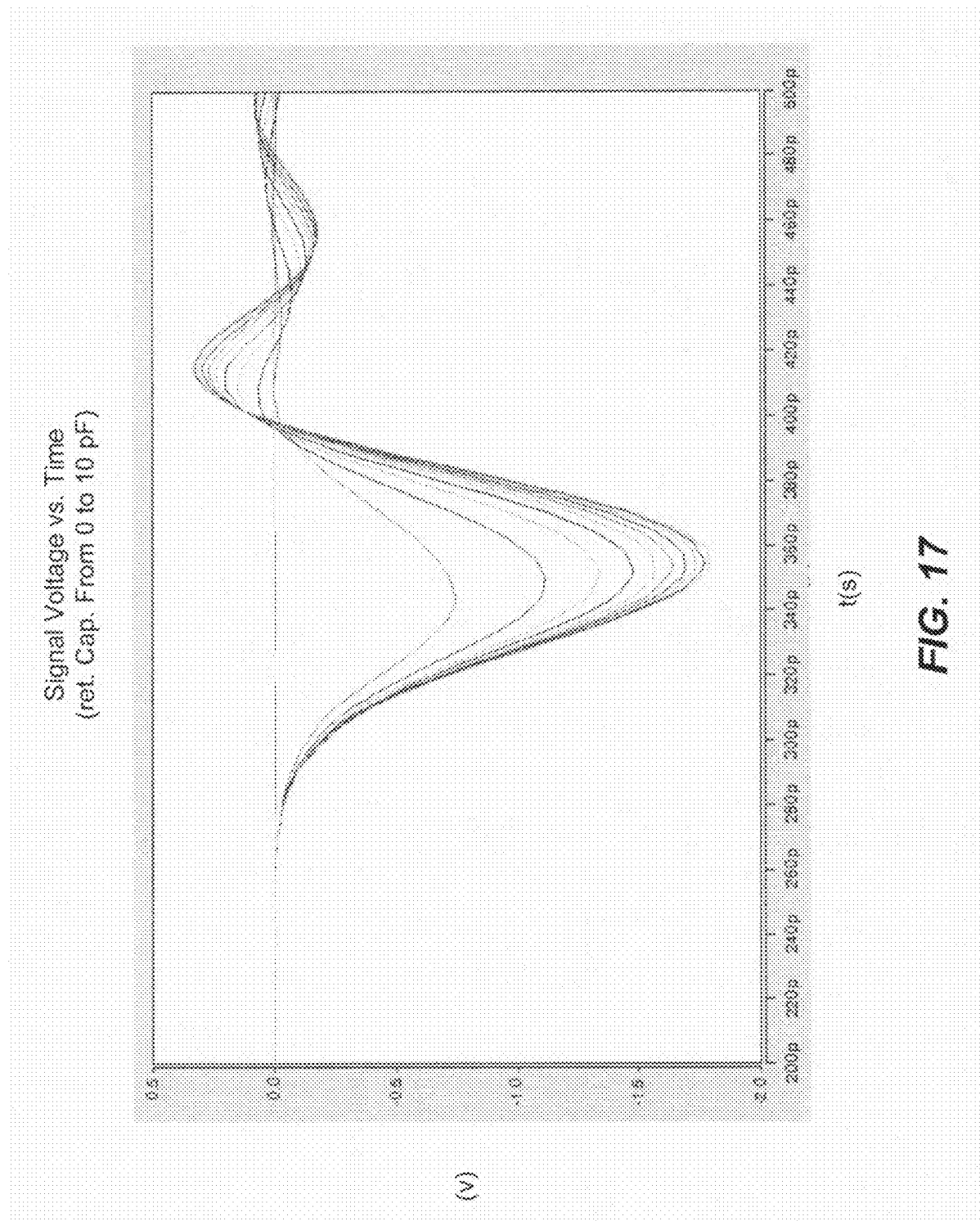
FIG. 17 is a graph of the simulated pulse output from the equivalent circuit depicted in FIG. 16 as the capacitance between MCP-OUT and the grid is varied from 0 to 10 pf in 1 pf steps.
Figure 18A:
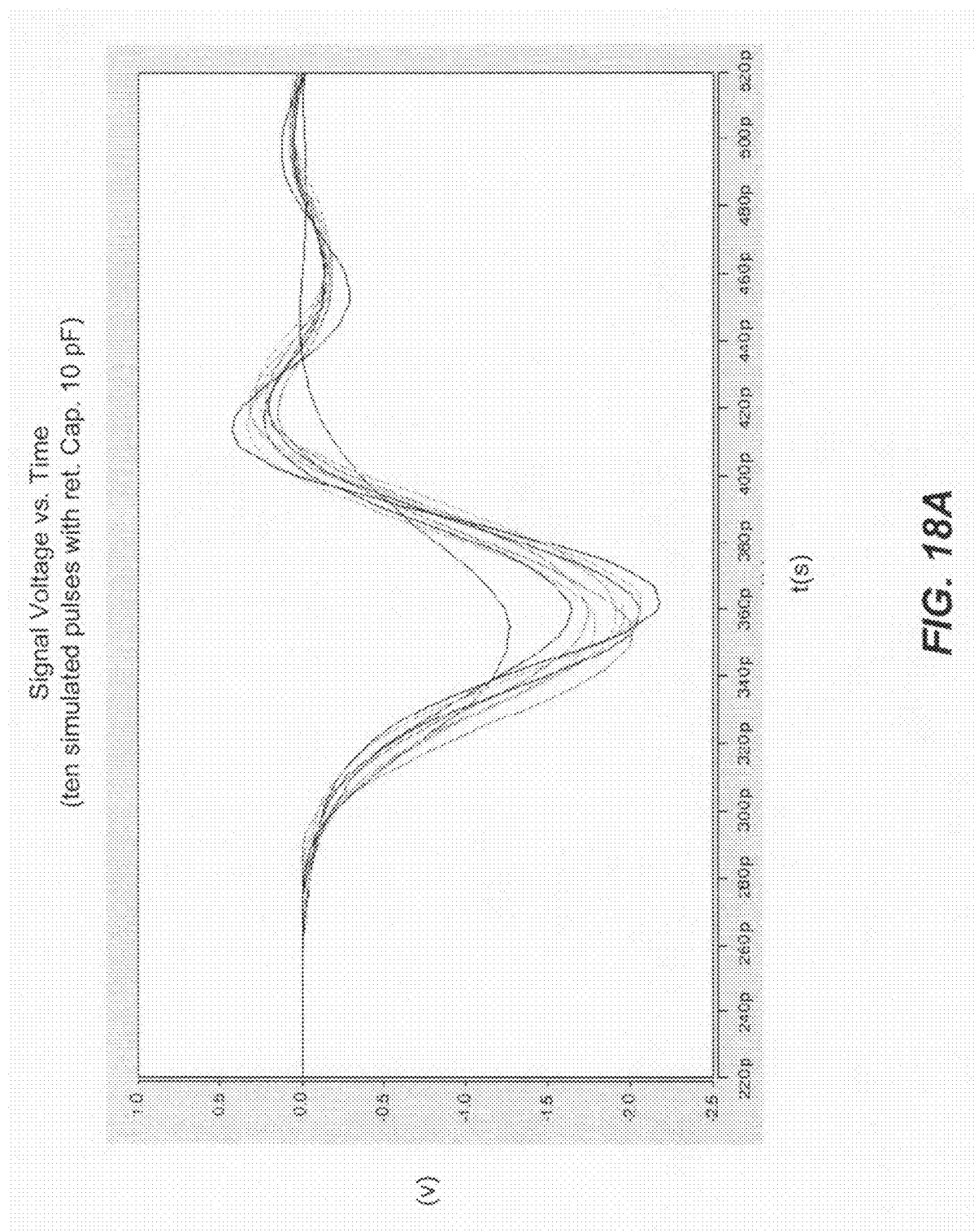
FIG. 18A depicts a graph of the simulated output for 10 particles incident on the MCP window from the equivalent circuit of FIG. 16 for a fixed grid to MCP-OUT capacitance of 10 pf.
Figure 18B:
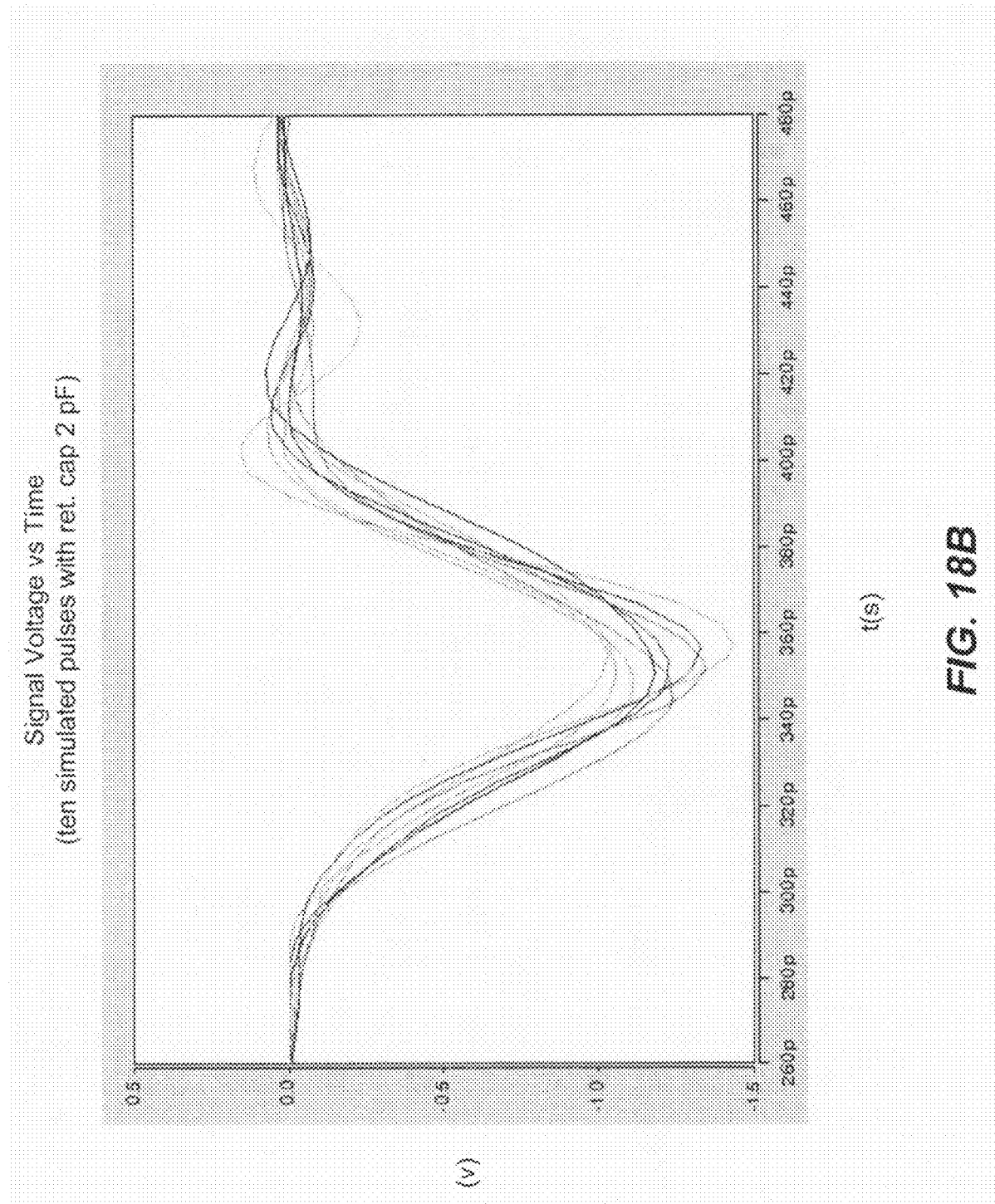
FIG. 18B depicts a graph of the same for a grid to MCP-OUT capacitance of 2 pf.

To test the idea of capacitively coupling the return path back to MCP-OUT a simple equivalent circuit is analyzed, shown in FIG. 16, to simulate the behavior. Input pulses are made with the detector simulation that starts with a relativistic particle traversing the window of the tube. The detector simulation may take into account the Cherenkov radiation spectrum, absorption in the window, path length of the photons to the photocathode, the photo-cathode response, the transit-time spread of the MCP, and the footprint of the charge on the anode pads. FIG. 17 depicts a graph of the simulated pulse output from the equivalent circuit of FIG. 16 as the capacitance between MCP-OUT and the grid is varied from 0 to 10 pf in 1 pf steps. FIG. 18A depicts a graph of the simulated output for 10 particles incident on the MCP window from the equivalent circuit of FIG. 16 for a fixed grid to MCP-OUT capacitance of 10 pf. FIG. 18B depicts a graph of the same for a grid to MCP-OUT capacitance of 2 pf.

OTHER APPLICATIONS

As discussed above, one psec in time resolution corresponds to 300 microns in spatial resolution. The detector disclosed above may also be used in PET scanning by allowing diction of photons from positron-electron annihilation or other sources of diagnostic radiation. Specifically, a time-of-flight system with a 1 ps time resolution may be used to associate photons with individual collision vertices at the Tevatron and LHC, where more than one collision occurs in a given beam crossing. With the addition of a converter (e.g., a thin sheet of lead), and the ability to measure spatial resolution at the face of the MCP with a resolution of 100 microns or so, when the two beams collide, there may be several individual particle collisions occurring at different times and different positions along the beams, each of which may produce photons and other particles. Being able to measure the arrival time of the photons to 1 ps may provide sub-millimeter resolution on their path length, helping one to distinguish which collision vertex created which photon.

Another application for the equal-time anode may include LIDAR. LIDAR stands for LIght Detection And Ranging, and uses the same principle as RADAR. The LIDAR instrument transmits light out to a target. The transmitted light interacts with and is changed by the target. Some of this light is reflected/scattered back to the instrument where it is analyzed. The change in the properties of the light enables some property of the target to be determined. The time for the light to travel out to the target and back to the LIDAR is used to determine the range to the target. The equal-time anode may be used to more accurately determine the range of the target.

Still another application for the equal-time anode may in the field of detection of materials, such as by using Fast Scintillation Detectors Using Direct-Gap Semiconductors. The scintillators, which may detect and identify radioactive materials, may be dependent on the timing resolution. The equal-anode may thus be used in determining time-of-flight neutron activation when one is attempting to detect certain materials, such as hazardous materials.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A detector for detecting a particle comprising:
   a charge emitter for emitting charge in response to receiving the particle;
   an anode comprising one or more pads and a plurality of conduits, the one or more pads for receiving the emitted charge and the conduits for transmitting the charge from the one or more pads; and circuitry in communication with the anode for sensing the emitted charge on the anode, wherein the conduits are constructed such that transit time of the charge through the conduits varies less than a predetermined time.

2. The detector of claim 1, wherein the conduits are constructed such that transit time of the charge through the conduits is approximately equal.

3. The detector of claim 1, wherein lengths of the conduits vary less than a predetermined length.

4. The detector of claim 3, wherein the lengths of the conduits are approximately equal.

5. The detector of claim 1, wherein the conduits comprise transmission lines.

6. The detector of claim 1, wherein the one or more pads of the anode comprise a plurality of pads; and wherein each of the pads is in communication with one of the plurality of conduits.

7. The detector of claim 6, wherein at least some of the conduits are connected at a connection point; and wherein the circuitry for sensing the emitted charge on the anode is in communication with the collection point.

8. The detector of claim 1, wherein the charge emitter comprises a window to receive the particle and create electromagnetic radiation, a photocathode to emit electrons when struck by the electromagnetic radiation, and a micro-channel plate to receive the electrons and send electrons to the anode.

9. A time of flight system comprising a plurality of the detectors as claimed in claim 1.

10. The time of flight system as claimed in claim 9, wherein the detectors are arranged side-by-side in a tiling pattern.

11. A detector for detecting a particle comprising:

a charge emitter for emitting charge in response to receiving the particle;

an anode for receiving the emitted charge;

a capacitive element for capacitively coupling to the charge emitter, the capacitive element being located proximate to the anode; and circuitry in communication with the anode for sensing the emitted charge on the anode.

12. The detector of claim 11, wherein the anode comprises one or more pads and at least one conduit, the one or more pads for receiving the emitted charge and the conduit for transmitting the charge from the pad; and wherein the capacitive element is proximate to the one or more pads.

13. The detector of claim 12, wherein the one or more pads and the capacitive element are in a common layer.

14. The detector of claim 13, wherein the one or more pads comprises a plurality of pads; and wherein the capacitive element at least partly encircles the pads.

15. The detector of claim 14, wherein the capacitive element comprises a grid.

16. The detector of claim 13, wherein the capacitive element completely encircles the pads in the common layer.

17. The detector of claim 11, wherein the anode comprises one or more pads and at least one transmission line, the one or more pads for receiving the emitted charge and the transmission line for transmitting the charge from the one or more pads; and wherein the capacitive element is connected to a ground plane of the transmission line.

18. The detector of claim 17, wherein the anode comprises a plurality of pads and a plurality of transmission lines with each of the pads in communication with one of the plurality of transmission lines; and wherein lengths of the transmission lines are approximately equal.

19. The detector of claim 11, wherein a portion of the charge emitter emits charge; and wherein inductance of a circuit comprising the portion of the charge emitter, the capacitive element, the anode, and the circuitry is less than inductance of the portion of the charge emitter, the anode, and the circuitry.

20. The detector of claim 11, wherein a portion of the charge emitter emits charge; and wherein circuit path length of a circuit comprising the portion of the charge emitter, the capacitive element, the anode, and the circuitry is less than circuit path length of the portion of the charge emitter, the anode, and the circuitry.

21. The detector of claim 11, wherein a portion of the charge emitter emits charge; and wherein variations in circuit path length of a circuit comprising the portion of the charge emitter, the capacitive element, the anode, and the circuitry are less than variations in circuit path length of the portion of the charge emitter, the anode, and the circuitry.

22. The detector of claim 11, wherein the charge emitter comprises a micro-channel plate; and wherein the capacitive element capacitively couples to at least a part of the micro-channel plate.

23. The detector of claim 11, wherein the charge emitter comprises an emitter output; and wherein the capacitive element has a DC voltage approximately equal to a DC voltage of the emitter output of the charge emitter.

24. A time of flight system comprising a plurality of the detectors as claimed in claim 11.

25. The time of flight system as claimed in claim 24, wherein the detectors are arranged side-by-side in a tiling pattern.

* * * * *